United States Patent [19]

DeGregoria et al.

[11] Patent Number: 5,249,424
[45] Date of Patent: Oct. 5, 1993

[54] ACTIVE MAGNETIC REGENERATOR METHOD AND APPARATUS

[75] Inventors: Anthony J. DeGregoria; Carl B. Zimm, both of Madison; Dennis J. Janda, McFarland; Richard A. Lubasz, Deerfield; Alexander G. Jastrab, Oconomowoc; Joseph W. Johnson, Madison; all of Wis. Evan M. Ludeman, Austin, Tex.

[73] Assignee: Astronautics Corporation of America, Milwaukee, Wis.

[21] Appl. No.: 894,777

[22] Filed: Jun. 5, 1992

[51] Int. Cl.$^5$ ............................................. F25B 21/00
[52] U.S. Cl. .............................................. 62/3.1; 62/467
[58] Field of Search .................................. 62/3.1, 467

[56] References Cited

U.S. PATENT DOCUMENTS

| | | | |
|---|---|---|---|
| 4,107,935 | 8/1978 | Steyert, Jr. | 62/3.1 |
| 4,332,135 | 6/1982 | Barclay et al. | 62/3.1 |
| 4,408,463 | 10/1983 | Barclay | 62/3.1 |
| 4,441,325 | 4/1984 | Bon-Mardion et al. | 62/3.1 |
| 4,459,811 | 7/1984 | Barclay et al. | 62/3.1 |
| 4,507,927 | 4/1985 | Barclay | 6.2/3.1 |
| 4,702,090 | 10/1987 | Barclay et al. | 6.2/3.1 |
| 4,704,871 | 11/1987 | Barclay et al. | 6.2/3.1 |

OTHER PUBLICATIONS

J. A. Barclay, et al., "Magnetic Refrigeration for Space Applications, Report on a Design Study," Los Alamos Scientific Laboratory Report, LA-8134, Feb. 1980.
C. R. Cross, et al., "Optimal Temperature-Entropy Curves for Magnetic Refrigeration", Cryogenic Engineering Conference, Jun. 1987.
J. A. Waynert, et al., "Evaluation of Industrial Magnetic Heat Pump/Refrigerator Concepts That Utilize Superconducting Magnets," Argonne National Laboratory report, ANL-89/23, Jun. 1989.
A. J. DeGregoria, et al., "Initial Test Results of an Active Magnetic Regenerative Refrigerator", International Cryocooler Conference, Oct. 25, 26, 1990, Plymouth, Mass.
C. B. Zimm, et al., "Materials for Regenerative Magnetic Cooling Spanning 20K to 80K," Cryogenic Engineering Conference 1991, Jun. 11-14, 1991, Huntsville, Ala.
A. J. DeGregoria, "Modeling the Active Magnetic Regenerator", Cryogenic Engineering Conference 1991, Jun. 11-14, 1991, Huntsville, Ala.
A. J. DeGregoria, "Test Results of an Active Magnetic Regenerative Refrigerator," Cryogenic Engineering Conference 1991, Jun. 11-14, 1991, Huntsville, Ala.
Dennis Janda, et al., "Design of an Active Magnetic Regenerative Hydrogen Liquefier," Cryogenic Engineering Conference, 1991, Jun. 11-12, 1991, Huntsville, Ala.

Primary Examiner—Ronald C. Capossela
Attorney, Agent, or Firm—Foley & Lardner

[57] ABSTRACT

In an active magnetic regenerator apparatus having a regenerator bed of material exhibiting the magnetocaloric effect, flow of heat transfer fluid through the bed is unbalanced, so that more fluid flows through the bed from the hot side of the bed to the cold side than from the cold side to the hot side. The excess heat transfer fluid is diverted back to the hot side of the bed. The diverted fluid may be passed through a heat exchanger to draw heat from a fluid to be cooled. The apparatus may be operated at cryogenic temperatures, and the heat transfer fluid may be helium gas and the fluid to be cooled may be hydrogen gas, which is liquified by the device. The apparatus can be formed in multiple stages to allow a greater span of cooling temperatures than a single stage, and each stage may be comprised of two bed parts. Where two bed parts are employed in each stage, a portion of the fluid passing from the hot side to the cold side of a first bed part which does not have a magnetic field applied thereto is diverted back to the cold side of the other bed part in the stage, where it is passed through to the hot side. The remainder of the fluid from the cold side of the bed part of the first stage is passed to the hot side of the bed part of the second stage.

53 Claims, 13 Drawing Sheets

VALVE POSITIONS FOR THREE-WAY VALVES

ACTIVE MAGNETIC REGENERATOR METHOD AND APPARATUS

FIELD OF THE INVENTION

This invention pertains generally to the field of magnetic refrigeration, particularly to active magnetic regenerative refrigeration apparatus, and to hydrogen liquifiers.

BACKGROUND OF THE INVENTION

Active magnetic regeneration combines a regenerator with a device which operates on the magnetocaloric effect. The operation of active magnetic regenerators is described in U.S. Pat. No. 4,332,135 to Barclay, et al. An experimental model of an active magnetic regenerator has been built and tested and is described in an article by A. J. DeGregoria, et al., "Test Results of An Active Magnetic Regenerative Refrigerator," Advances in Cryogenic Engineering, Vol. 37B, 1991. A detailed model of the active magnetic regenerator is given in an article by A. J. DeGregoria, Advances in Cryogenic Engineering, Vol. 37B, 1991.

An active magnetic regenerator is a type of cooler or heat pump which utilizes the magnetocaloric effect. Materials which exhibit the magnetocaloric effect warm upon magnetization and cool upon demagnetization, or vice versa. In a basic active magnetic regenerator (AMR) device, a bed of magnetic material which is porous to a heat transfer fluid is located between two heat exchangers, with a mechanism provided for effecting reciprocating fluid flow through the bed of magnetic material from one heat exchanger to the other. A mechanism also is provided for magnetizing and demagnetizing the bed. There are four parts to a AMR cycle: bed magnetization, which warms the magnetic material and the fluid in the bed by the magnetocaloric effect; cold side to hot side fluid flow through the bed with release of heat through a hot side heat exchanger; bed demagnetization, cooling the magnetic material and the fluid in the bed; and hot side to cold side fluid flow through the bed, with the cooled fluid absorbing heat at the cold side heat exchanger.

An AMR device is an extension of the regenerator concept. A regenerator is used to recover heat when fluid is exchanged in a reciprocating fashion between two reservoirs of different temperatures. The regeneration cycle has two parts: flow from the cold reservoir to the hot reservoir through the bed, followed by a flow from the hot reservoir to the cold reservoir through the bed.

In a regenerator device, the shuttle fluid is the total fluid mass which flows in one direction prior to reversal. After many reciprocating flows of the shuttle fluid through the bed, the bed material establishes a temperature profile which increases from the side at which the cold fluid enters (the cold side) to the side at which the hot fluid enters (the hot side). During the flow from the cold side to the hot side, the fluid enters at a temperature $T_c$, the temperature of the fluid in the cold side reservoir. The shuttle fluid is warmed by the bed as it passes through the bed and leaves the bed at a temperature below $T_h$, the temperature of the hot side reservoir. During the flow from the hot side to the cold side, the fluid enters the bed at the temperature $T_h$, and is cooled by the bed as it passes through, leaving the bed at a temperature above $T_c$. Over the entire cycle, the bed theoretically receives no net heat. It acts as an intermediate heat reservoir, absorbing heat from the warm fluid and rejecting it to the cool fluid. The difference in temperature between the temperature at which the shuttle fluid enters the cold reservoir and the temperature $T_c$ of the cold reservoir fluid, $\Delta t$, represents heat flow from the hot reservoir to the cold reservoir. At worst, this difference would be $T_h - T_c$, which is the case if there is no regenerator present. The ratio of $\Delta t$ to $(T_h - T_c)$ is referred to as the regenerator ineffectiveness.

An AMR device magnetizes and warms the bed prior to fluid flow from cold to hot, and then demagnetizes and cools the bed prior to flow from the hot side to the cold side. As illustrated in the diagram of FIG. 1, the application of the magnetic field to the magnetized bed creates two pairs of profiles of temperature and relative position in the bed, one when the bed is magnetized and the other when the bed is unmagnetized. The difference between the two bed profiles at any location is the adiabatic temperature change of the magnetic material in going through the change in magnetic field. If the adiabatic temperature change is large enough, the fluid emerging from the cold side of the bed can have a temperature which is lower than the temperature of the cold reservoir, resulting in net cooling of the cold reservoir, rather than a heat leak from the hot reservoir to the cold reservoir which would be the case with an ordinary regenerator. Of course, in accordance with the laws of thermodynamics, work must be done in such a process since heat is flowing from a cold to a hot reservoir. In the case of an AMR, the work is performed by the drive mechanism which moves the magnet and/or the bed relative to one another. By utilizing heat exchangers at both the hot side and the cold side, heat can be removed from the cold side heat exchanger through the AMR and released through the hot side heat exchanger. A structure for accomplishing this transfer is disclosed in the aforesaid U.S. Pat. No. 4,332,135.

SUMMARY OF THE INVENTION

In the active magnetic regenerator apparatus of the present invention, the flow of the heat transfer fluid through the bed of magnetic material is preferably unbalanced, so that more fluid flows through the bed from the hot side to the cold side than through the bed from the cold side to the hot side. The excess heat transfer fluid is diverted to the reservoir of fluid which will enter the hot side of the bed. In this manner, improved efficiency over conventional AMR devices is obtained, as well as allowing cooling of another fluid if the diverted fluid is passed through a heat exchanger. In a specific application of the present invention, the heat transfer fluid is helium, the device is operated at cryogenic temperatures, and the heat exchanger draws heat from gaseous hydrogen to cause liquefaction of the hydrogen.

The apparatus of the present invention may include plural stages of active magnetic regenerators, each having two beds of magnetic material. Each stage is operated at a progressively lower temperature. The magnetic field is applied alternately to one or the other of the sets of beds in each of the stages. The heat transfer fluid flows through one set of the unmagnetized beds in each stage in series from the hot side to the cold side of each, and then in series through the other sets of magnetized beds in each stage from the cold side to the hot side of each. However, between each stage, part of the flow exiting from the cold side of the bed is diverted to mix with the flow exiting from the hot side of the next colder stage to form a flow stream which passes into the cold side of the second bed of the same stage from which the fluid was diverted. Fluid exiting from the cold end of the bed in the last stage is directed partly to the cold end of the other bed of the last stage and partly through a heat exchanger where it absorbs heat and then is mixed with the fluid exiting from the hot end of the first stage. The fluid from the hot end of the first stage is pumped back to the hot end of the other bed in the first stage, preferably after passing through a heat exchanger where some of the heat that has been picked up by the fluid is removed. For example, where helium is used as the circulating heat transfer fluid, the hot end heat exchanger can include a bath of liquid nitrogen at 77 K which removes heat from the helium being returned to the hot end of the first bed of the first stage. Hydrogen to be liquified may also be passed through the liquid nitrogen bath to precool the hydrogen gas before it is passed through the heat exchanger where sufficient heat is removed from it by the cold helium to liquify the hydrogen. The heat exchanger is preferably of the counter flow type to maintain a gradient in temperature from the cold end to the hot end of the heat exchanger for maximum efficiency of heat transfer.

The splitting of the flow of fluid from the cold end of the active magnetic regenerator apparatus of the present invention, with part of the flow directed to the hot side and part of the flow directed through a heat exchanger and then back to the hot side, results in a locally very small temperature difference between the heat transfer fluid and the bed once the bed achieves an equilibrium thermal gradient. The small local temperature difference between the heat transfer fluid and the bed results in very small entropy generation in the cooling process. By utilizing multiple stages of the regenerator apparatus of the invention, relatively large temperature spans can be achieved while utilizing magnetic materials for the beds in each stage which are optimally suited for the temperature range of the heat transfer fluid passing through the bed. The partial diversion of fluid between each stage from the cold side of one bed to the cold side of the other bed again results in relatively small local temperature differential between the heat transfer fluid and the bed at each stage, thereby minimizing the generation of entropy. Consequently, the present invention provides highly efficient cooling of a heat transfer fluid which may itself be the end product of the cooling process, or the circulation of the heat transfer fluid to exchange heat from another fluid which is to be cooled. The invention is particularly suited to operation at cryogenic temperatures for liquefaction of hydrogen.

In a reciprocating active magnetic regenerator of the invention, the two part beds of magnetic material, in one or more stages may be maintained stationary, and superconducting solenoidal magnets are driven in a reciprocating manner so that the magnets apply magnetic field alternately to one part and then the other part of the beds. The magnetic materials preferably are formed in pellets which together are porous to the heat transfer fluid which flows through the interstices between the pellets and are mounted in containers which provide a path of the heat transfer fluid through multiple sets of the magnetic material in each bed. The subsections of the bed are thermally isolated from one another so as to minimize resistance to fluid flow through the bed while further insuring a temperature gradient between each subsection of the bed. In a rotating embodiment of the invention, the bed for each stage is located at the rim of a rotating wheel and comprises individual bed units. Sliding seals control heat transfer fluid flow to the beds, which pass into and out of the magnetic field as the wheel rotates. The seals are preferably located at the hub of the wheel, to minimize the velocity of the sliding contact between the seals and the wheel, with channels extending from a manifold at the wheel hub to the magnetic material beds at the rim of the wheel. As the wheel rotates, a bed unit passes through an angular region where the field is nearly zero. The manifold seals provide flow of heat transfer fluid through the bed unit in a direction from the hot side to the cold side. As the wheel rotates, the bed section then passes through an angular region where the field increases, and the seals allow no heat transfer fluid flow through that region. When the bed unit goes through an angular region where the field is high and nearly constant, the seals of the manifold provide flow in a direction from the cold side to the hot side of the bed section. As the wheel continues to rotate and the bed section passes through an angle of rotation where the field is decreasing, the manifold seals cut off flow of heat transfer fluid. This cycle is repeated as the wheel continues to rotate.

Further objects, features and advantages of the invention will be apparent from the following detailed description when taken in conjunction with the accompanying drawings.

DETAILED DESCRIPTION OF THE INVENTION

Figure 1:
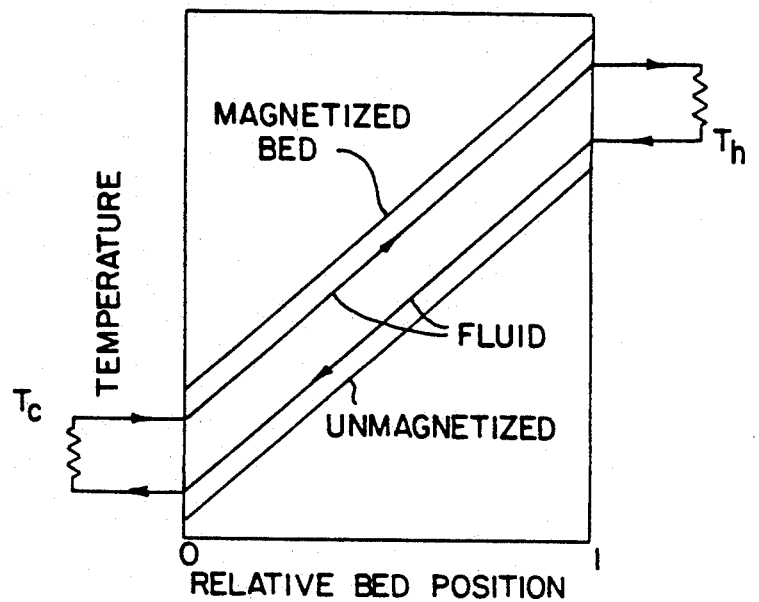
FIG. 1 is a diagram showing the temperature cycle in an active magnetic regenerator in accordance with the prior art.
Figure 2:
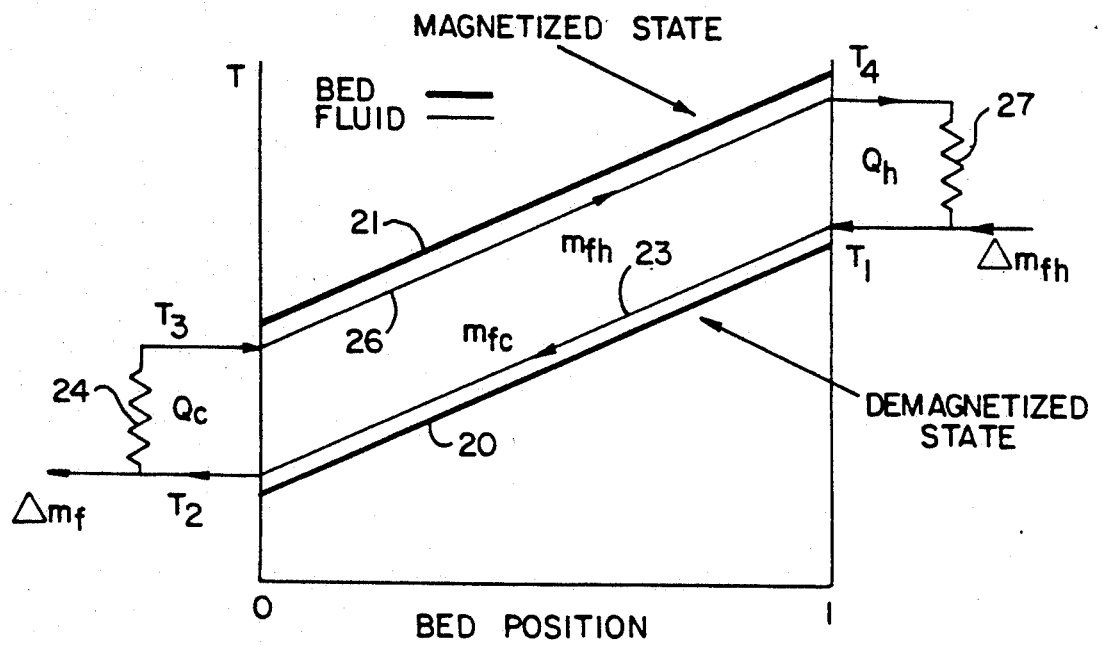
FIG. 2 is a diagram of an idealized temperature cycle of the heat transfer fluid flow in an active magnetic regenerator device in accordance with the present invention.

The principle of operation of the active magnetic regenerator (AMR) apparatus of the present invention is illustrated with respect to the temperature and bed position diagram of FIG. 2. In this diagram, the line 20 indicates the bed position versus temperature diagram for the AMR bed in a demagnetized state, and the line 21 is the temperature versus bed position line in the magnetized state. The heat transfer fluid enters the hot side of the bed at a temperature $T_1$ when the bed is in the demagnetized state and is cooled by the bed along the line 23 to exit at the cold end of the bed at a temperature $T_2$. Part of the exiting fluid is passed through a cold side heat exchanger 24 in which the fluid receives heat (e.g., from a lower temperature stage), and exits at a higher temperature $T_3$. The heat transfer fluid reenters the cold side of the AMR bed at the temperature $T_3$ and follows the temperature line 26 to exit from the magnetized AMR bed at a temperature $T_4$. The fluid at the temperature $T_4$ passes through a hot side heat exchanger 27 wherein heat is removed from the fluid (e.g., to a higher temperature stage) so that the fluid exiting from the heat exchanger 27 is near the temperature $T_1$ again. A portion of the fluid exiting from the cold end of the AMR bed at the temperature $T_2$ is diverted so that it does not pass through the heat exchanger 24. This volume of fluid, $\Delta m_f$, represents the fluid which is cooled. As this volume of fluid is increased, the cooling available at the cold end of the AMR decreases. At a specific volume, there will be no more cooling at the cold heat exchanger (further increase will cause the cold temperature to rise). At this point, the AMR becomes purely a cooler of fluid. Since the volume of fluid, $\Delta m_f$, is cooled as it passes through the bed with only a small temperature difference between it and the bed which is cooling it, very little entropy is generated and the process is very efficient.

If the temperature $T_2$ at which the heat transfer fluid exits the AMR bed is below the liquifaction point of the fluid, the diverted fluid volume $\Delta m_f$, or some portion of it, may be the end product of the AMR cycle, in which case the heat exchanger 24 would not be utilized and a portion of the fluid at the temperature $T_2$ would be drawn off for storage. Generally, to avoid possible contamination, it is preferred that the liquified end product be physically separated by the heat exchanger 24 from the heat transfer fluid.

In general, the magnetic material utilized in an unbalanced flow AMR apparatus should have properties such that the adiabatic temperature change increases with the absolute temperature. The adiabatic temperature change ($\Delta T_s$) of materials that undergo a single sharp magnetic ordering that is ferromagnetic in nature reaches a maximum at the Curie temperature $T_0$. Use of a material whose Curie point is equal to or higher than the hot heat sink temperature, $T_h$, of the AMR apparatus insures that the adiabatic temperature change will be monotonically increasing with temperature over the range of operation of the AMR device. Because the maximum in the magnetic heat capacity of ferromagnetic materials also occurs at the Curie point, it is preferred to use a material whose Curie point is very close to $T_h$.

Figures 3, 4:
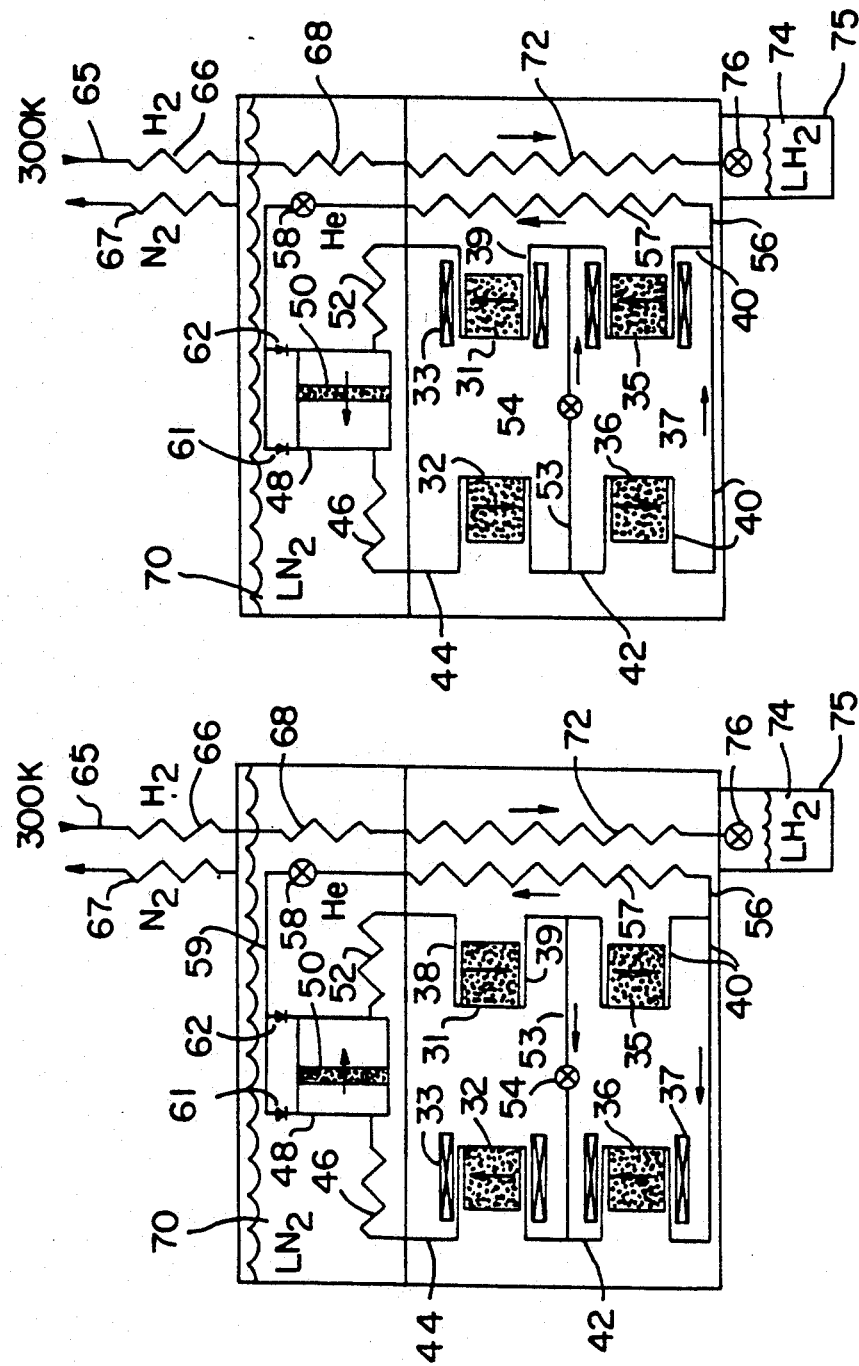
FIG. 3 is a schematic diagram of AMR apparatus in accordance with the invention used as a hydrogen liquifier, showing fluid flow in one direction through the apparatus.
FIG. 4 is a schematic view of the apparatus of FIG. 3 showing fluid flow in the opposite direction.

The diagram of FIG. 2 illustrates the operation of a single stage AMR device in accordance with the invention. FIGS. 3 and 4 illustrate an exemplary two stage AMR device embodying the principles of the invention in a reciprocating design for a hydrogen liquifier. In the apparatus of FIGS. 3 and 4, a first AMR stage includes a first AMR bed part 31, a second AMR bed part 32, and a magnet 33 which moves between the AMR beds 31 and 32. A second stage includes a first AMR bed part 35, a second AMR bed part 36, and a magnet 37 which moves between the beds 35 and 36. The magnets 33 and 37 preferably are mounted to move together and apply or remove the magnetic fields from the bed parts at the same time. Heat transfer fluid circulates through the AMR device in piping through the paths established as follows: a first pipe 38 delivers fluid to the hot side of the first stage first bed part 31, piping 39 delivers fluid from the cold side of the first bed part 31 to the hot side of the second stage first bed part 35, a pipe 40 delivers fluid from the cold side of the first bed part 35 of the second stage to the cold side of the second bed part 36 of the second stage, a pipe 42 delivers fluid from the hot side of the bed part 36 to the cold side of the second bed part 32 of the first stage, a pipe 44 delivers fluid from the hot side of the first bed side 32 to a first hot side heat exchanger 46, which is in communication with a displacer 48 which is shown for illustrative purposes as having a central piston 50, and a second hot side heat exchanger 52 is in communication with the displacer 48 on the opposite side of the piston 50 from the heat exchanger 46 and delivers its fluid to the pipe 38. A diverter pipe 53 having a flow regulator 54 is connected between the pipe 39 and the pipe 42 to divert part of the flow from the bottom end (cold side) of the first bed part 31 of the first AMR stage to the bottom end (cold side) of the second AMR bed part 32 of the first stage. A portion of the fluid in the line 40 passing from the cold side of the second stage AMR beds 35 or 36 is diverted into a pipe 56 leading to a counter-flow heat exchanger 57 and thence through a proportioning valve 58 to a line 59 which splits into a first check valve line 62 leading to one end of the displacer 48 on one side of the piston 50 and into a second check valve line 61 leading to the other end of the displacer 48 on the other side of the piston 50. The other side of the counter flow heat exchanger receives gaseous hydrogen from a hydrogen pipeline 65 which may be at ambient temperature, e.g., 300 K, which then passes through a first heat exchanger 66 which cools the hydrogen with liquid nitrogen gases being boiled off which pass through the heat exchanger 66. The cooled hydrogen then passes through a further heat exchanger 68 which is immersed in a liquid nitrogen bath 70, and then passes into the second side 72 of the counterflow heat exchanger 57 where it is cooled by the fluid passing through the other side of the heat exchanger 57. The hydrogen leaving the side 72 of the heat exchanger exits as liquid hydrogen 74 which is accumulated within a reservoir 75.

In the position of the apparatus shown in FIG. 3, the magnets 33 and 37 are over the second beds 32 and 36, so that these beds are at a higher temperature, while the beds 31 and 35 are demagnetized and therefore at a lower temperature. The piston 50 of the displacer 48 moves to the right, forcing fluid downwardly through the AMR bed 31 to the AMR bed 35, where the heat transfer fluid is split between the lines 40 and 56. The fluid exiting from the cold end of the second stage AMR bed 35 passing through the line 40 reaches the cold end of the second stage AMR bed 36 where it increases in temperature as it absorbs heat from the bed 36, passing up through the line 42 to the cold end of the AMR bed 32 to pick up heat as it passes through the bed 32 and finally exits on the line 44. As the fluid passes through the heat exchanger 46 into the reservoir within the displacer 48, it loses heat to the liquid nitrogen bath 70 through the heat exchanger 46 provided that the liquid nitrogen is at a temperature below the temperature of the heat transfer fluid exiting from the hot side of the first stage bed 32.

The operation of the AMR device is then reversed as shown in FIG. 4 wherein the magnets 33 and 37 are moved over the beds 31 and 35, which now increase in temperature, and the beds 32 and 36 are cooled. The piston 50 of the displacer 48 moves to the left, forcing fluid on a path through the heat exchanger 46, the line 44, through the hot side of the bed 32 to the cold side, to the pipe 42, to the hot side of the bed 36 and out the cold side, to the line 40 where a portion of the fluid is bypassed through the heat exchanger 57 and a portion passes into the cold end of the bed 35 and thence up to the cold side of the bed 31 and through the bed to the heat exchanger 52. A portion of the flow from the cold side of the bed 32 on the line 42 is diverted through the line 53 back to the cold side of the first stage bed 31.

The lower or second stage AMR beds 35 and 36 will typically have a greater temperature differential between the helium entering and leaving the beds at the hot side compared to the temperature differential of the helium of entering and leaving the cold end of the first or upper stage beds 31 and 32. By mixing the flow emerging from the hot end of the lower bed with flow leaving the cold side of the upper bed, the helium heat transfer fluid temperature entering the cold side of the upper bed can be appropriately reduced as desired. The bypass valve 54 allows the amount of flow that is bypassed to be adjusted to obtain the desired temperature in the beds. The second bypass valve 58 allows control of the fraction of the flow of helium leaving the cold side of the second stage bed that passed through the helium/hydrogen heat exchanger. The heat exchanger 57 preferably has a number of catalytic beds for ortho-para (O/P) conversion of the hydrogen product stream, as is typical practice in hydrogen liquefaction. A valve 76 may also be provided to allow regulation of Joule-Thompson expansion of the cooled hydrogen stream exiting from the heat exchanger side 72 to produce liquid hydrogen 74 in the reservoir 75.

Figure 5:
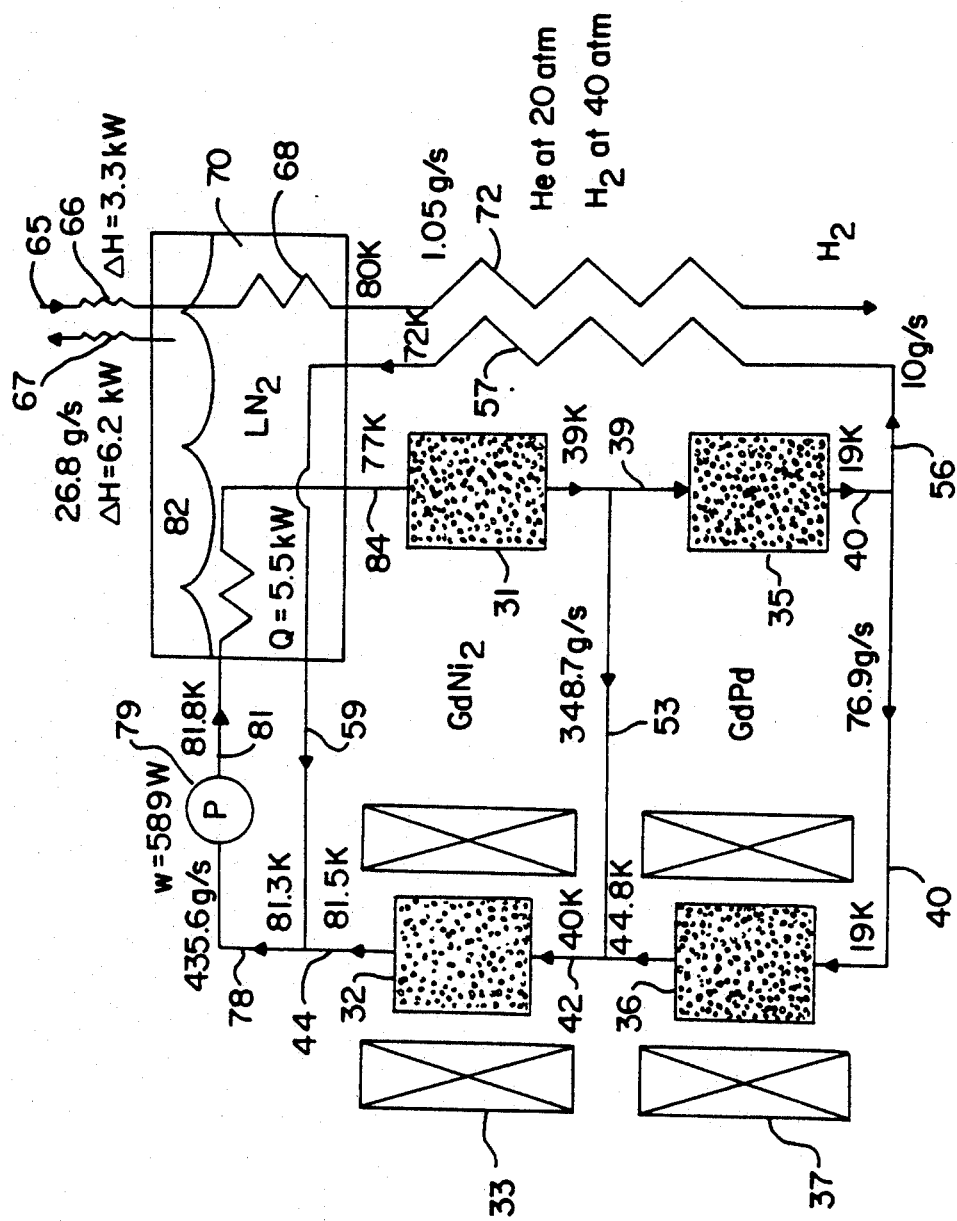
FIG. 5 is a schematic view of an AMR apparatus in accordance with the invention for hydrogen liquifaction illustrating a portion of the helium transfer fluid cycle and having hot side heat transfer.

A variation of the AMR apparatus of FIGS. 3 and 4 as shown in FIG. 5 utilizes a pump rather than a reciprocating displacer to move the helium heat transfer fluid through the device. For purposes of illustration, the magnets are shown in one position and the helium is shown flowing in the direction illustrated by the arrows in FIG. 5 for this position of the magnets. Of course, after a period of time, the positions of the magnets and the flow through the bed parts must be switched. The flow exiting from the hot side of the AMR bed 32 and the flow on the line 59 from the heat exchanger 57 are joined at a line 78 which delivers the helium to a pump 79 which pumps the fluid out on a line 81 to a heat exchanger 82 within the liquid nitrogen bath 70, and returns the cooled helium on a line 84 to the hot side of the bed 31 of the first AMR stage.

Figure 6:
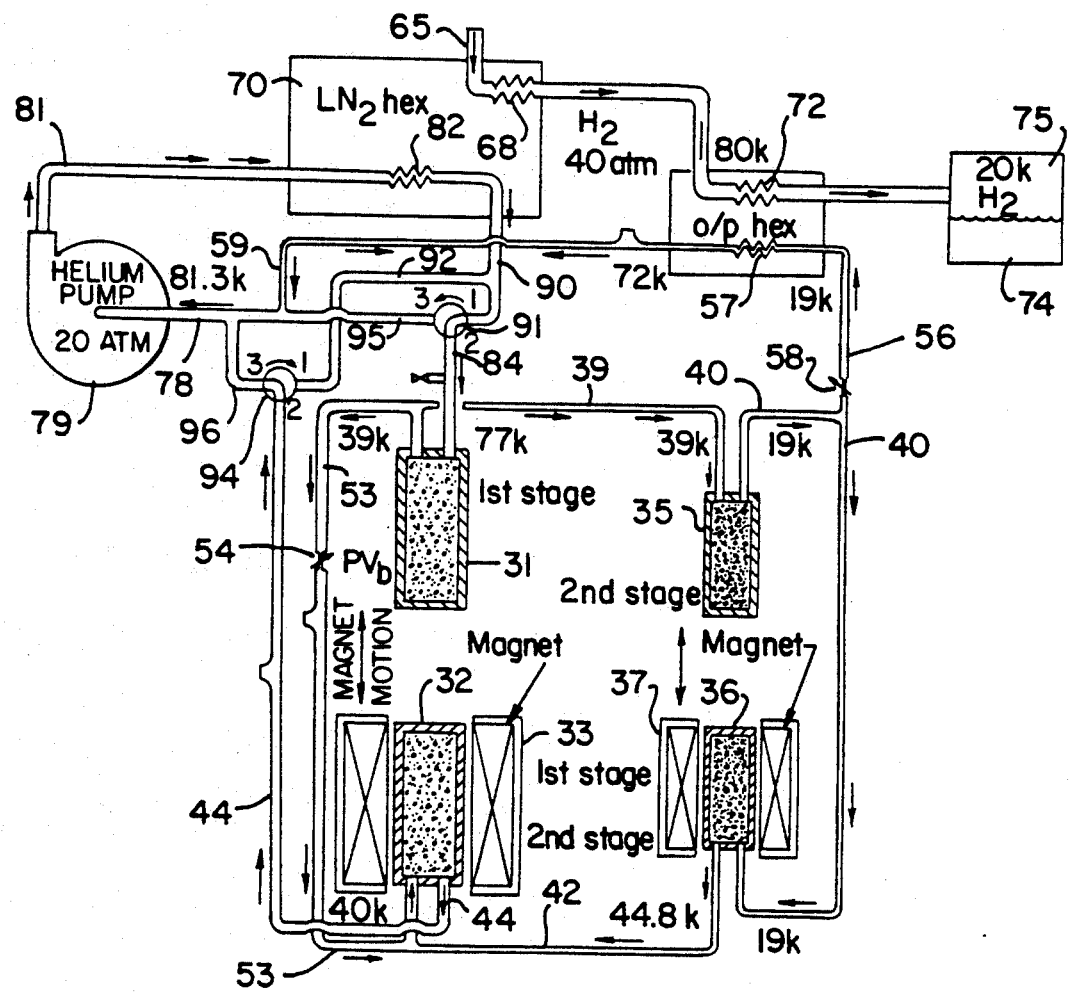
FIG. 6 is a more detailed schematic diagram of a full cycle hydrogen liquifier.
Figure 6:
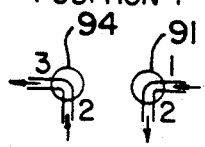
Figure 6:
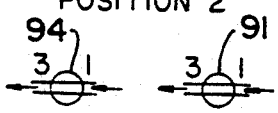
Figure 6:
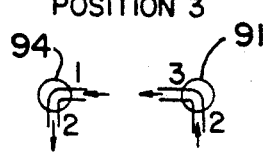

A schematic of a two-stage AMR apparatus which has substantially continuous helium circulation is shown in FIG. 6. Similar parts to the components of FIGS. 3-5 are labelled similarly in FIG. 6. In the apparatus of FIG. 6, the fluid exiting from the heat exchanger 82 is provided on a line 90 to a first three-position valve 91 and on a line 92 to a second three-position valve 94. The valve 91 is also in communication with a line 95 which is in communication with the line 78 and the line 59. The valve 94 is in communication with a line 96 which extends to the line 78, and is also in communication with the line 44 from the second AMR bed 32 of the first stage. The valves 91 and 94 are preferably remotely controllable three position valves. In the first position, which is illustrated in FIG. 6, the flow through the AMR beds is substantially on the paths as shown in FIG. 3, in which fluid exiting from the hot side of the second AMR bed 32 of the first stage on the line 44 passes on a path through the valve 94 and thence through the line 96 to the return line 78 and into the input of the pump. The fluid passing from the outlet of the pump through the heat exchanger 82 on the line 90 flows on a path through the valve 91 into the line 84 leading to the hot side of the first bed 31 of the first stage heat exchanger. When the valves 91 and 94 are in their second position, the lines 90 and 95 are in communication and the lines 92 and 96 are in communication, thereby bypassing the output of the pump 79 directly back to its input. During this time, there is no flow through the AMR beds. This valve position would be utilized during the transitional motion of the magnets 33 and 37 from their position shown in FIG. 6 to their second position in which they would be in place over the AMR beds 31 and 35. After the magnets 33 and 37 are in place over the beds 31 and 35, the valves 91 and 94 are switched to their third positions, in which the line 92 is in communication with the line 44, thereby providing fluid from the pump on a path through the lines 92 and 44 to the second bed 32 of the first stage; thence to the second bed of the second stage, and the line 84 from the first stage bed is in communication with the line 95, so that the fluid passing through the first stage AMR bed 31 passes on a path to the input of the pump 79, resulting in fluid flow through the system substantially on the paths as illustrated in FIG. 4. The valves 91 and 94 continue to be switched in coordination with the motion of the magnets 33 and 37 as the cycle is repeated.

Exemplary specifications for a reciprocating magnet hydrogen liquefier constructed as shown in FIG. 6 to provide 0.1 ton per day of hydrogen liquifaction is set forth in Table 1 below.

TABLE 1

| Two-Stage 0.1 Ton/Day Liquefier Design | |
|---|---|
| | First Stage / Second Stage |
| Bed length (cm) | 5.0 / 5.0 |
| Bed volume (l) | 6.0 / 2.2 |
| Bed porosity | 0.44 / 0.4 |
| AMR period(s) | 2.0 / 2.0 |
| Pressure drop (atm) | 0.19 (max) / 0.045 (max) |
| He pressure (atm) | 20 / 20 |

TABLE 1-continued
Two-Stage 0.1 Ton/Day Liquefier Design

| | First Stage / Second Stage |
|---|---|
| $H_2$ pressure (atm) | 40 / 40 |
| Magnetic material | $GdNi_2$ / GdPd |
| Particle size (mm) | 0.15 / 0.15 |
| Magnetic field (T) | 7 / 5 |
| Input work (kW) | 3.46 / 0.64 |
| Heat rej. at 77K (kW) | 5.5 |
| $N_2$ boil off (ton/day) | 2.6 |
| Operating temp. | 77–40K / 39–19K |
| Liquefaction efficiency | 0.27 |

The liquefaction efficiency is defined as the ideal work required to liquify hydrogen from standard temperature and pressure (STP) divided by the real work as computed by the model. Much of that real work comes from the work performed to liquefy the nitrogen consumed. The efficiency of the liquid nitrogen plant is typically about 0.45. The liquefaction efficiency neglects pump inefficiency, drive inefficiency and heat leaks. By careful design, these losses can be made small enough such that the overall efficiency should be about 0.25.

The material for the upper stage, $GdNi_2$, has an adiabatic temperature change ($\Delta T_s$) that is approximately linear in temperature between its 75 K Curie point and 45 K, and hence is appropriate to a stage with a small flow imbalance. The material for the lower stage, GdPd, has an adiabatic temperature change that increases much faster than linearly in temperature below its 38 K Curie point, and hence is suited to a stage with greater flow imbalance. Some ferromagnetic materials suitable for use in AMR stages operating below the Curie point ($T_0$) of each material are given in Table 2 below:

TABLE 2
Ferromagnetic Refrigerants Suited for Unbalanced Flow AMR Liquefiers:

| Material | $T_0$ (K) | $\Delta T$ at $T_0$ (0–7T) |
|---|---|---|
| $GdNi_2$ | 75 | 5.8 |
| GdNi | 70 | 7.5 |
| $GdNiC_{0.95}Co_{0.05}$ | 81 | 7.1 |
| $GdNi_{0.2}Cu_{1.8}$ | 50 | 4.6 |
| $GdPd_{0.75}Ni_{0.25}$ | 45 | 8.0 |
| GdPd | 38 | 8.7 |
| $Er_{0.8}La_{0.2}$ | 45 | 5.3 |
| $Er_{0.75}Dy_{0.25}Ni$ | 25–30 | 6.0 |
| $Er_{0.86}Gd_{0.14}Al_2$ | 20–30 | 8.7 |
| $GdNi_{1-x}Co_x$ | 70 (x = 0) to 120 (x = 0.25) | |

Eutectic mixtures of such materials, such as of $GdNi_2$ and GdNi, may also be used, with the Curie point raised to 77 K by substituting a small amount of cobalt for a portion of the nickel (e.g., with cobalt substituted for about 1% to 5% of Ni).

The regenerator beds may be formed of small spherical particles of magnetic material, with the beds being porous to heat transfer fluid which flows through the interstices between the particles.

Figure 7:
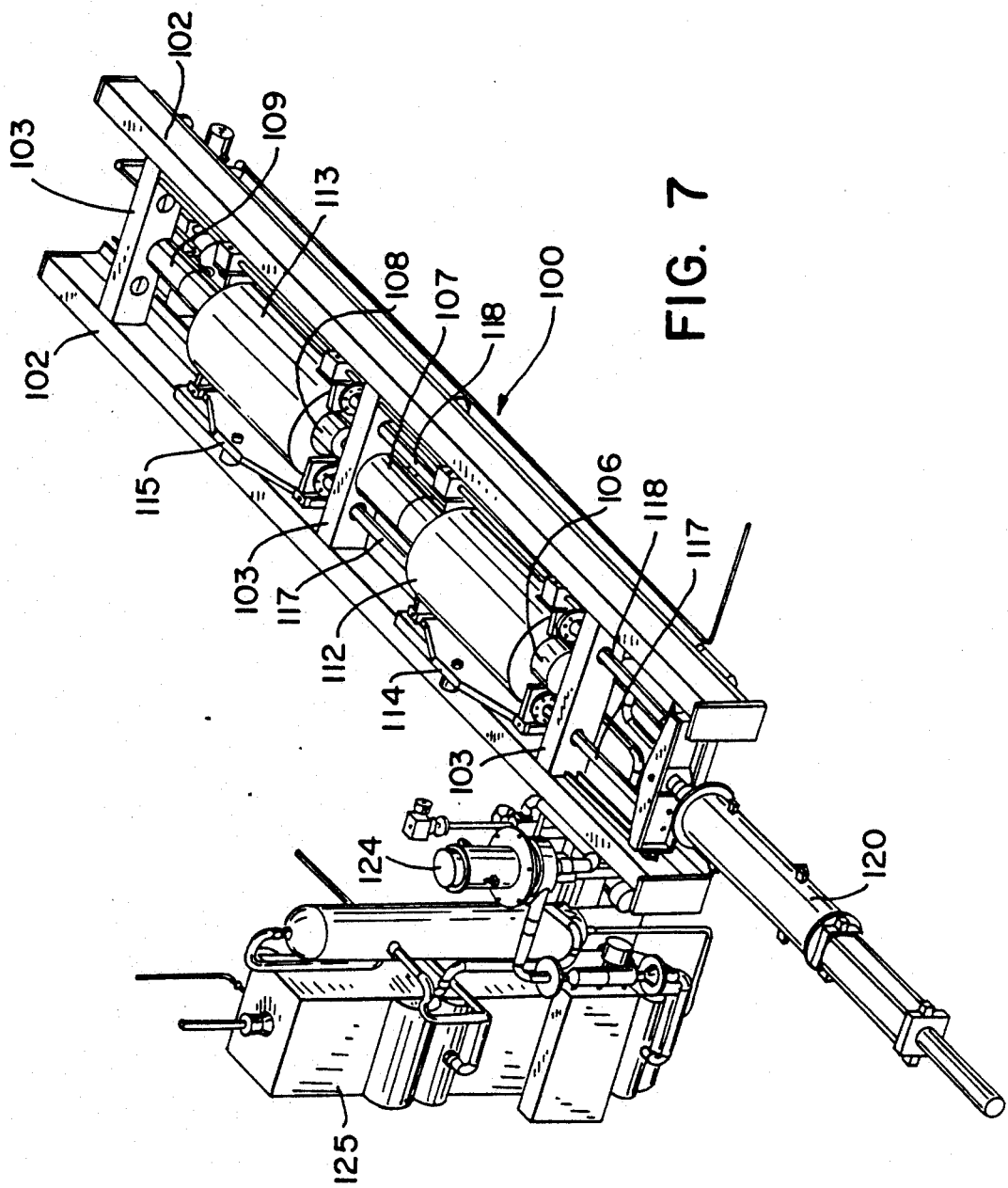
FIG. 7 is a perspective view of a reciprocating drive AMR apparatus in accordance with the present invention.

A perspective view of a reciprocating AMR hydrogen liquefaction apparatus in accordance with the invention is shown generally at 100 in FIG. 7. The AMR apparatus 100 includes a pair of support rails 102 with cross members 103 which support between them first stage regenerator beds 106 and 107 and second stage regenerator beds 108 and 109. A first superconducting solenoidal magnet 112 is mounted so it can surround and pass between the first stage AMR beds 106 and 107, and a second superconducting solenoidal magnet 113 is mounted so it can pass between the second stage AMR beds 108 and 109. The magnets 112 and 113 are mounted on carriages 114 and 115, respectively, for sliding movement on the rails 102. Drive rods 117 and 118 are connected to the carriages 114 and 115 and are driven by a reciprocating driver 120 (e.g., a hydraulic or pneumatic drive) to provide reciprocating motion of the magnets 112 and 113 between a first position in which magnets 112 and 113 are over the AMR beds 106 and 108 with the beds within the internal bore of the solenoidal magnets, respectively, and a second position in which the magnets 112 and 113 are over the AMR beds 107 and 109, respectively. A helium pump 124 is provided to circulate helium through the system, and a liquid nitrogen heat exchanger 125 provides heat exchange between the incoming hydrogen and the liquid nitrogen and between the liquid nitrogen and the helium, all in the manner described above.

Figure 8:
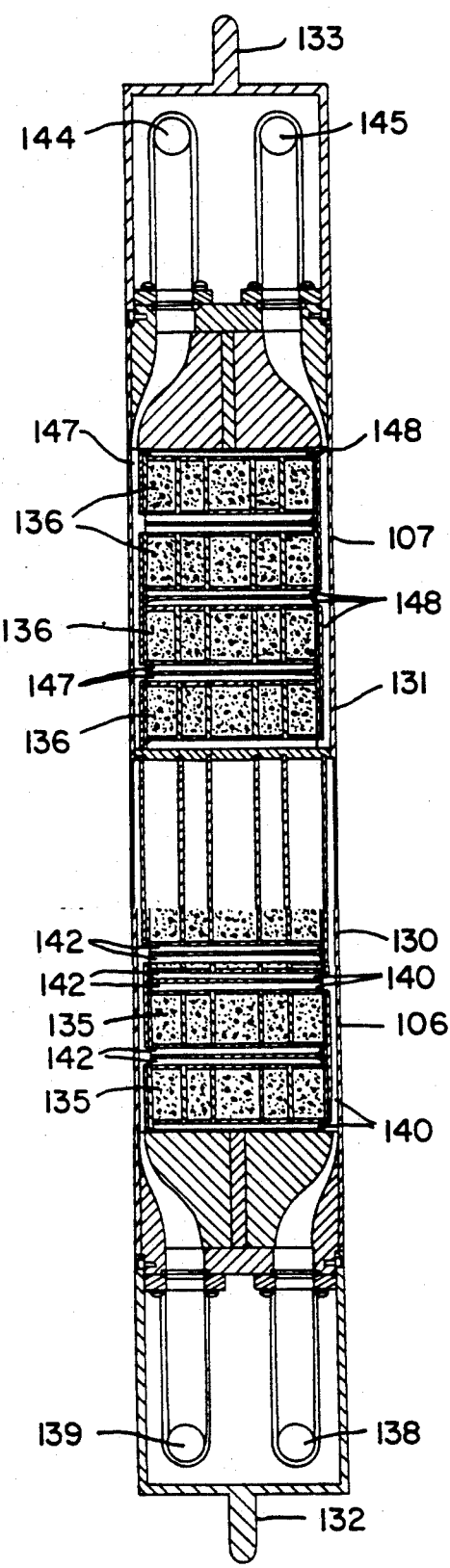
FIG. 8 is a cross-sectional view through a stage of the magnetic material bed of the apparatus of FIG. 7.

Of course, the structure of FIG. 7 would be enclosed to maintain the apparatus at the desired cryogenic operating temperature, and the cryogenic magnets 112 and 113 are provided with cryogenic liquid (e.g., liquid helium) in a conventional manner to maintain them at the superconducting temperature of the superconducting windings that form the magnets 112 and 113. Each magnet is contained in its own dewar filled with liquid helium. Flexible bellows (not shown) may be provided to supply the dewars with liquid helium and to remove helium vapor. For the embodiment shown, and for which the specifications are given above, the bed diameter for a stage is generally larger than its length. To better utilize magnet bore volume, the bed in each half of each stage is divided, as illustrated in FIG. 8 for the regenerator beds 106 and 107. The bed parts 106 and 107 are formed within elongated cylindrical tubular housings 130 and 131 which are joined together and which are mounted at end pieces 132 and 133 to the cross braces 103. The housing 130 and 131 may be integrally joined and form part of a one piece tubular housing. The first bed part 106 of the first stage is composed of several bed sections 135 (e.g., the four shown) and the second bed 107 of the first stage is composed of several bed sections 136. The bed sections 135 and 136 are stacked in the housings as shown in FIG. 8. The heat transfer fluid, e.g., helium gas, enters a port 138 at one end of the bed part 106 and exits from a port 139. Channels 140 between the bed sections 135 convey the incoming heat transfer fluid from the port 138 to the lower side of the sections 135. Channels 142 convey the heat transfer fluid, e.g., helium, from the other side of the bed sections 135 to the port 139. Similarly, the second bed port 107 has a first port 144 and a second port 145, and channels 147 provide communication from the first port 144 to one side of the bed sections 136, and channels 148 provide communication from the port 145 to the other side of the bed sections 136. The second stage beds 108 and 109 are formed similarly. It is seen that although the bed sections are in stacked relation, the heat transfer fluid flows through the sections in parallel so that each volume of fluid flows through only one bed section as it flows through a bed part. The magnetic material within the bed sections 135 and 136 is preferably in the form of small pellets, e.g., spheres, which allow flow of the gaseous heat transfer fluid through the interstices between the pellets at a reasonable rate.

Figure 10:
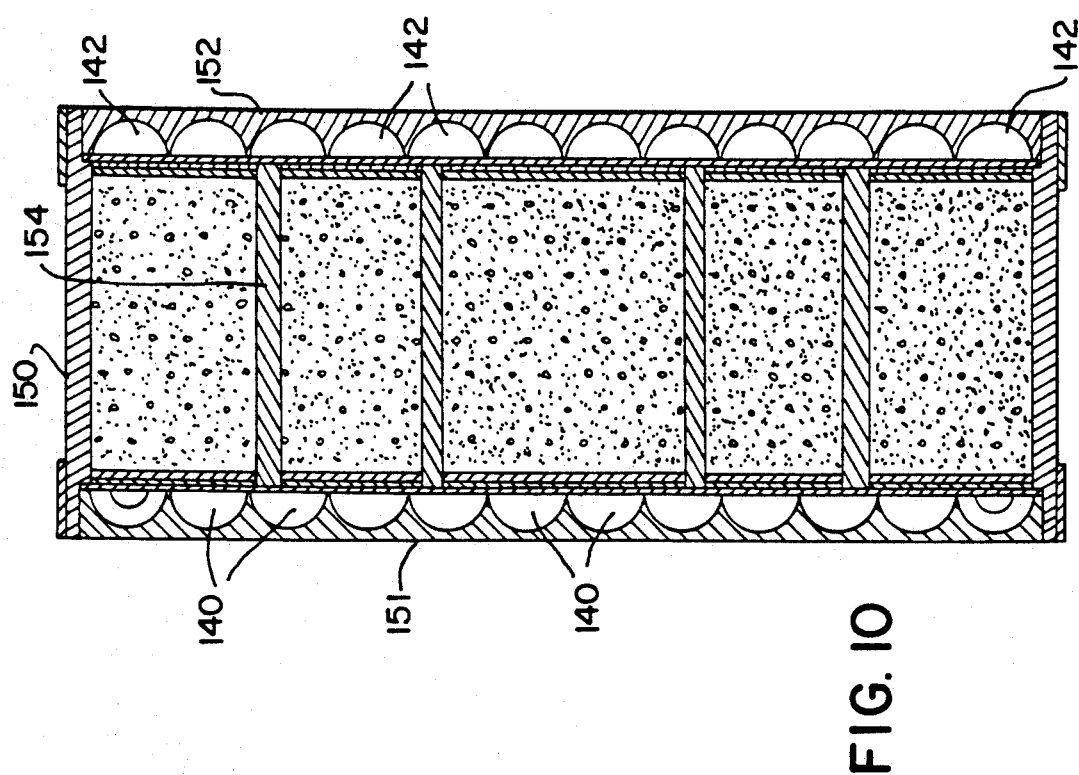
FIG. 10 is a cross-sectional view through the section of FIG. 9 taken generally along the lines 10—10 of FIG. 9.
Figure 9:
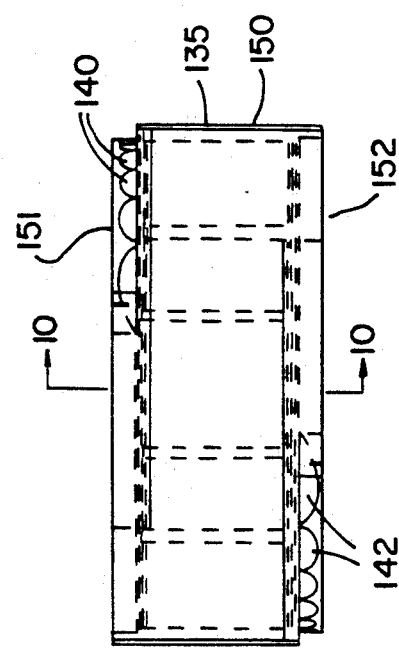
FIG. 9 is a side view of one of the sections of the magnetic material bed of FIG. 8.
Figure 11:
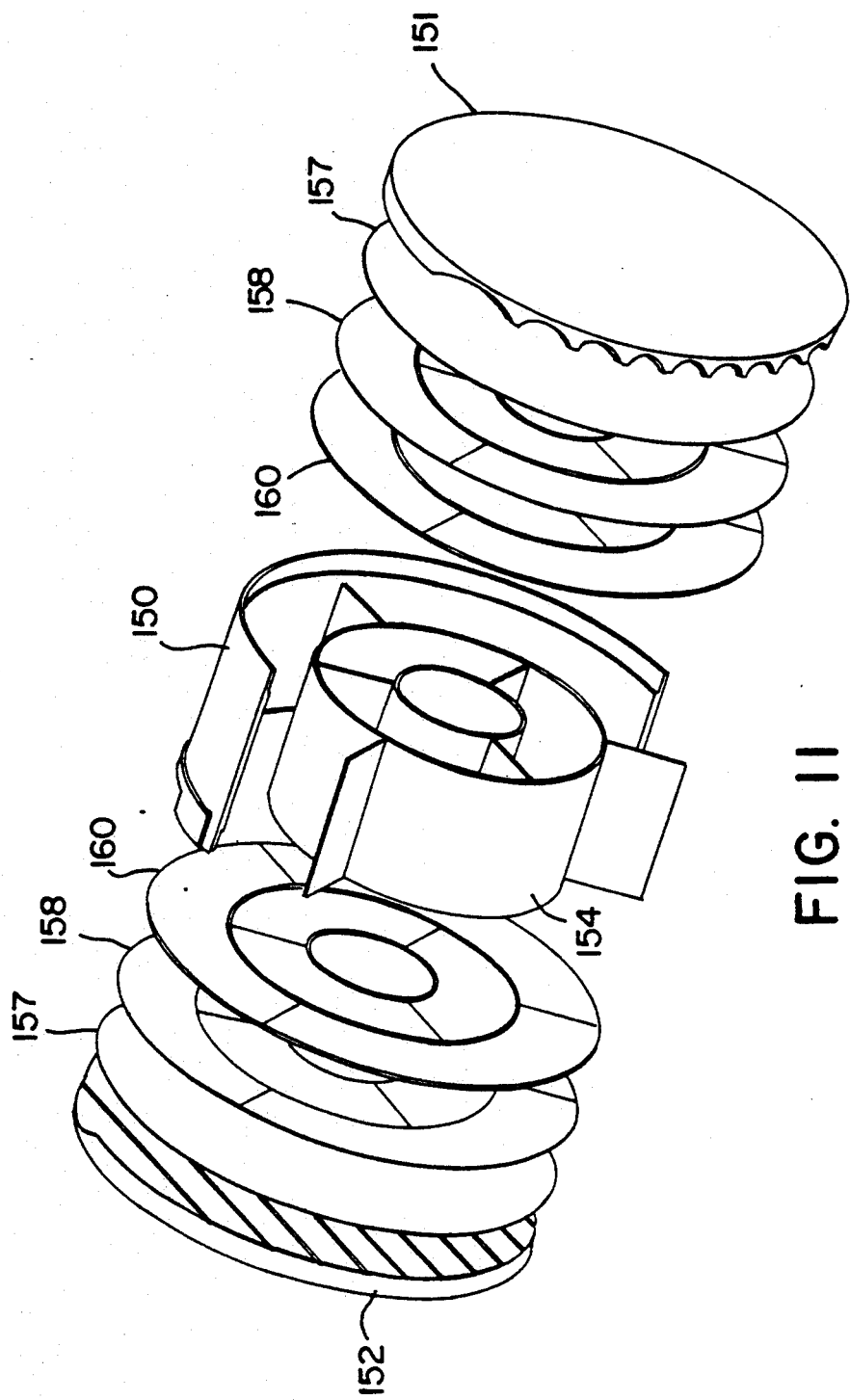
FIG. 11 is an exploded view of the structural members of the magnetic material bed section of FIG. 9.

An exemplary construction for a bed section, such as the bed section 135, is shown in the detailed views of FIGS. 9-11. The other bed sections may be formed similarly. As illustrated therein, each bed section includes a cylindrical outer ring 150, and end caps 151 and 152 closing the ends of the outer ring 150 which have lateral channels 140 and 142 formed therein, preferably as semi-cylindrical channels, which act as flow headers in the manner illustrated in FIGS. 9-11 to direct flow of heat transfer fluid laterally through the channels of one end cap, then axially through the magnetocaloric material and then laterally through the channels of the other end cap. As best illustrated in the exploded view of FIG. 11, which shows the parts thereof partially broken away, the bed sections also preferably include a flow divider 154 which segregates the axial flow through the magnetic material to help evenly distribute the flow therethrough, perforated plates 157 (e.g., formed of non-magnetic material) on each side under the headers 151 and 152, fine mesh screens 158 beneath the perforated plates 157, and a fiber pad 160 beneath the screens 158 which are in contact with the magnetic material contained within the flow dividers 154. The structural material of each bed section may be various suitable cryogenic materials, preferably of low electrical conductivity, such as G-10.

Figure 12:
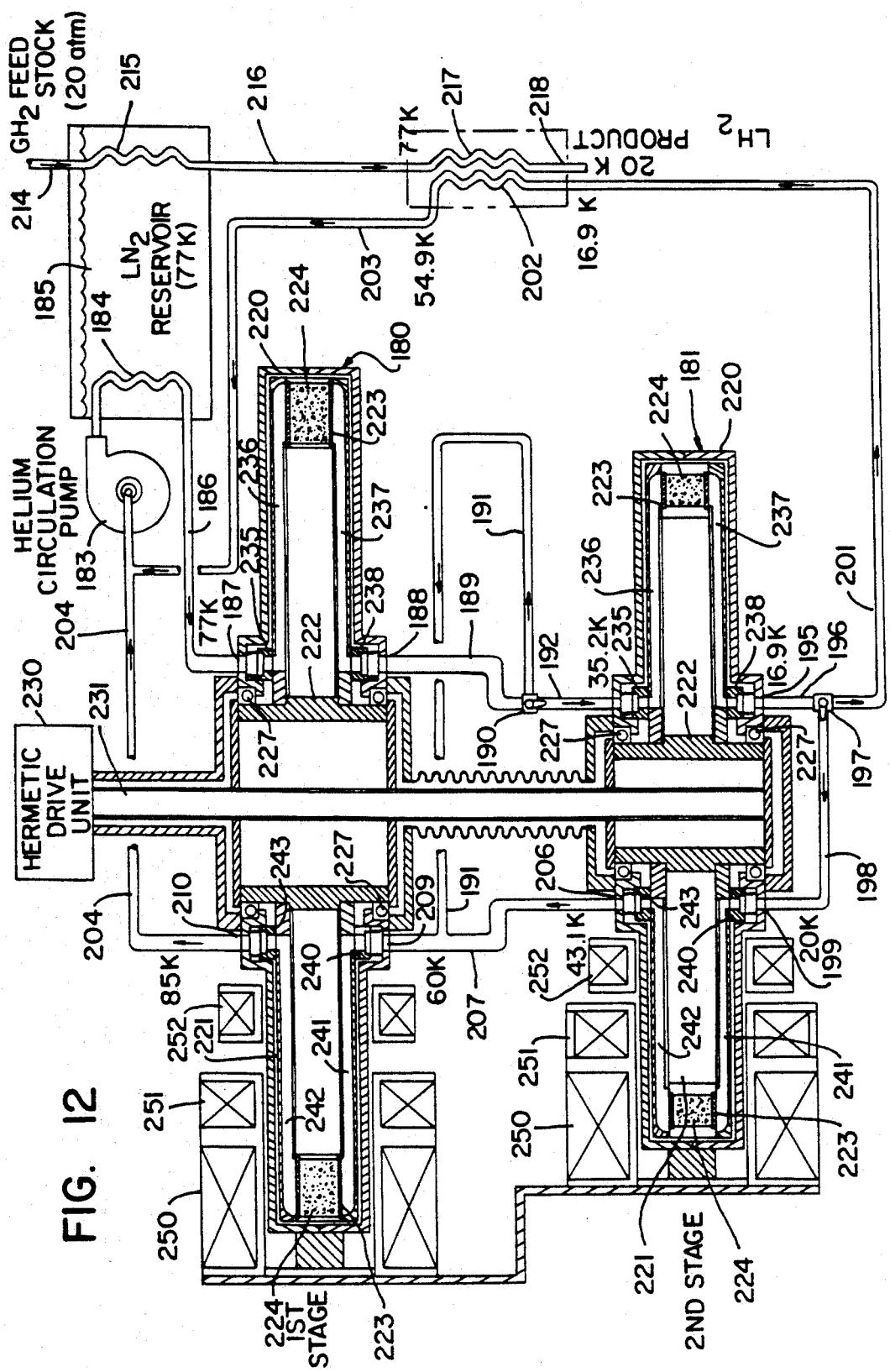
FIG. 12 is a partially schematic cross-sectional view of a two stage rotary AMR hydrogen liquifier apparatus in accordance with the invention.

A cross-sectional view through a two-stage rotary active magnetic regenerator apparatus in accordance with the invention is shown in FIG. 12. The AMR apparatus of FIG. 12 includes a first stage wheel assembly 180 and a second stage wheel assembly 181. The heat transfer fluid, e.g., helium gas, is driven by a pump 183 through a heat exchanger 184 in a liquid nitrogen bath 185 and thence on a line 186 to a first stage hot side input port 187. The heat transfer fluid follows a path out of a first stage cold side output port 188 onto a line 189 which leads to a flow division and proportioning valve 190. A portion of the flow from the line 189 is passed by the valve to a line 192 and thence to the hot side input port 193 of the second stage wheel assembly 181. The helium gas passing from the cold side output port 195 of the wheel assembly 181 on a line 196 is divided by a flow porportioninq valve 197 into a first stream, which passes on a line 198 to a cold side input port 199 of the second stage wheel assembly 181, and a second stream which passes on a line 201 to a heat exchange element 202 for heat exchange with hydrogen gas, and then follows a path on a return line 203 which joins with another input line 204 to return the helium to the input of the pump 183. The portion of the helium flow that passed from the line 198 to the input port 199 passes through the wheel assembly 181 at a second stage hot side output port 206 on a line 207. The fluid flow from the line 207 is joined with the fluid flow from a line 191 which passes from the proportioning valve 190, with the joined stream being passed to the cold side input port 209 of the first stage wheel assembly 180. The heat transfer gas passed from the hot end output port 210 of the wheel assembly 180 is provided on a line 204 to the input of the helium circulation pump 183. Hydrogen gas to be liquefied is passed on a line 214 through a heat exchanger 215 in the liquid nitrogen reservoir 185 and thence on a line 216 to the helium/hydrogen heat exchanger and ortho-para converter 217 and is discharged on a discharge line 218 which may include a liquefaction valve (not shown).

The flow paths for the two stage rotary AMR apparatus of the invention are preferably the same as those for the reciprocating version, except that the rotary version is preferably constructed so that no switching valves external to the rotary wheels are required because of the action of the manifold seals 235, 238, 240 and 243. Thus, there is continuous flow of the heat transfer fluid in a single direction on a path through all of the connecting conduits.

Each of the AMR stage assemblies 180 and 181 has an external housing 220 to seal off the internal parts of the wheel, and an internal rotating wheel 221 having a hub 222 and a rim section 223 which contains the AMR bed sections 224. Bearings 227 are provided between the hub 222 and the housing 220 to support the wheels 221 for rotation. A hermetically sealed drive unit 230, such as an electric motor, has an output shaft 231 which is connected to the hubs 222 to rotate the same as the shaft 231 is rotated. Typically, the stage assemblies will be sealed within a vacuum dewar for insulation purposes.

A manifold including a sliding seal 235 provides communication between helium flowing into the input port 187 and a channel 236 which extends out to an AMR bed unit 224. A channel 237 extends from the AMR unit 224 to a manifold including a sliding seal 238 which provides the helium flowing therethrough to the output port 188. Similarly, a sliding seal 240 provides communication from the cold side input port 209 on the first stage to a channel 241 leading to one of the AMR units 224, and the gas passed through the AMR unit is directed on it by a channel 242 to a sliding seal 243 of a manifold which directs the outgoing gas through the output port 210 to the line 204. The same types of manifold seals are provided in the second stage wheel assembly 181. Race track type magnets 250, 251 and 252 are placed around one side of the first stage wheel assembly 180, and similar magnets are placed around one side of the second stage wheel assembly 181. As the wheels 221 rotate, an AMR bed section unit goes through an angular regions where the field from the magnets 250-252 is nearly zero. The seals 235 and 238, located near the hubs so as to reduce velocity of sliding parts and thus wear, provide flow through the bed section 224 which is outside the magnetic field in the downward direction. As the wheel continues to rotate, that bed section then goes through an angular region where the field is increasing. However, at this point the seals 235 are out of alignment with the particular channels 236 and 237 which had lead to the particular AMR bed section unit. Thus, there is no helium flow through the bed section unit at that time. The bed section then passes into the region between the magnets 250-252 where the field is high and nearly constant. At that point, the seals 243 and 240 come into communication with the channels 241 and 242 to provide flow in the upward direction through the AMR units 224. As the AMR units 224 pass out of the constant magnetic field region, the seals 240 and 243 are out of communication with the channels 241 and 242, thus cutting off the helium flow in the region where the magnetic field is decreasing on that particular AMR unit. In this manner, a complete cycle for one of the particular AMR units is completed. Thus, it is seen that there is flow downwardly through the AMR unit when it is outside of the magnetic field, thus from a hot side to a cold side, and flow upwardly through the same AMR unit when the AMR unit is in the magnetic field, thus providing flow of the helium fluid from a cold side to a hot side. The partial diversion of the flow in line 189 to the line 191 to join the flow from the line 207 before the helium passes into the input port 209 allows the temperature of the gas passing into the channel 241 of the first stage to be at a temperature near the cold side of the AMR bed unit 224 when it is in the magnetic field, and therefore raised in temperature. The partial flow through the line 201 to the helium-hydrogen heat exchanger results in cooling of the hydrogen gas going through the hydrogen side 217 of the heat exchanger and raising of the temperature of the helium gas to the point where, in the line 203, it is at a temperature close to the higher temperature helium gas in the line 204 which has passed upwardly from the AMR wheels.

Figure 13:
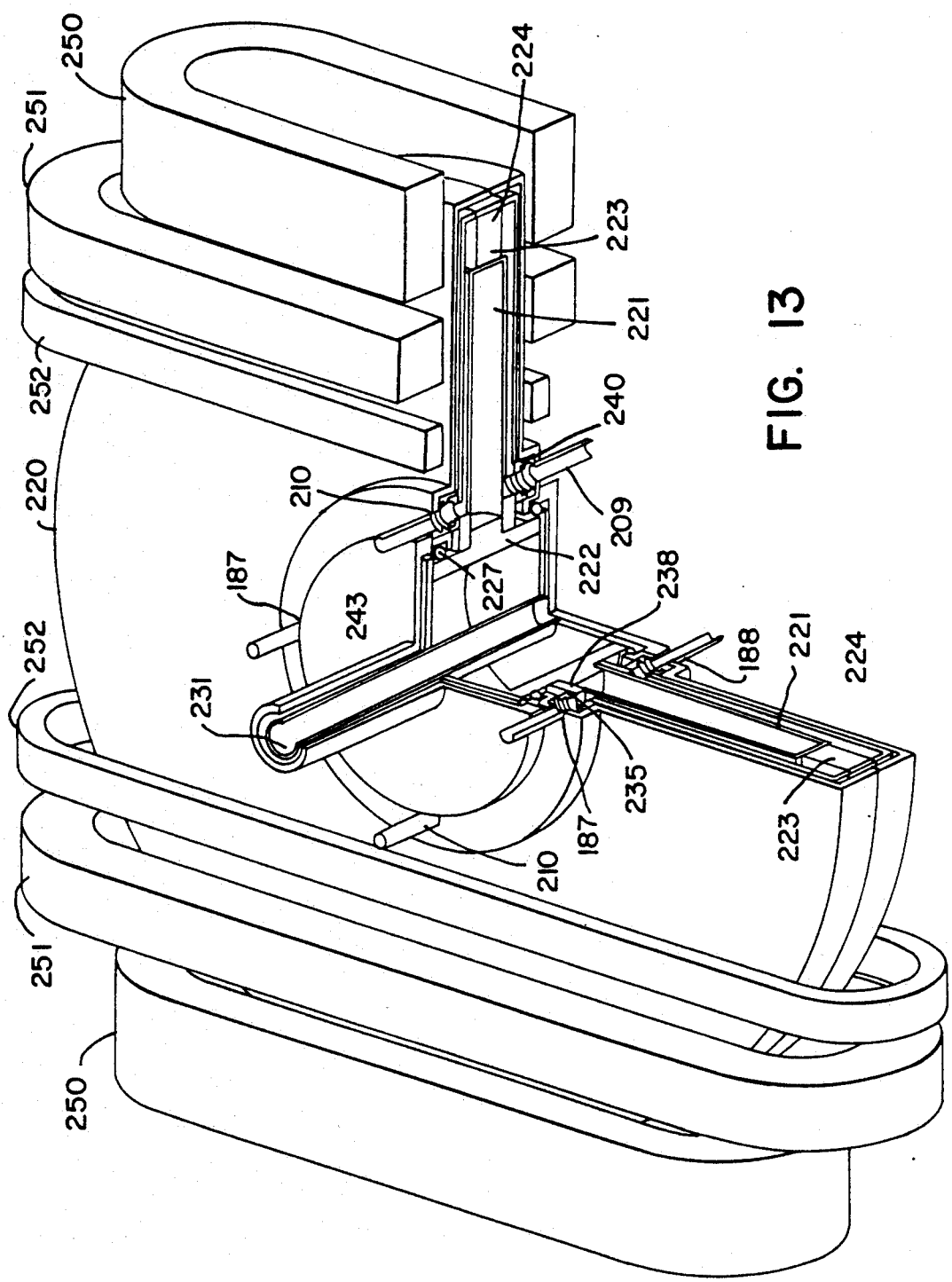
FIG. 13 is a perspective and partially cut-away view of a rotary AMR apparatus in accordance with the invention.

FIG. 13 is a perspective view of a modified embodiment of a rotary AMR apparatus in which a single wheel is utilized with two sets of magnets. As shown in FIG. 13, there are two sets of magnets 250-252, mounted over opposite quadrants of the wheel. The upper input ports 187 and the lower output ports 188 are located at positions equally spaced from the sets of magnets 250-252, so that they communicate with AMR bed units which are completely out of the magnetic field from these magnets. The top output ports 210, and the bottom input ports 209, are located adjacent to the magnets 250-252 so as to communicate with regenerator bed units which are within the maximum of the magnetic field of these magnets. The wheel assembly structure of FIG. 13 allows twice the flow rate to be achieved inasmuch as each regenerator bed unit 224 passes in and out of the magnetic field twice during each revolution and flow passes through two bed units simultaneously in each direction, and the use of two magnets allows the magnetic forces imposed on the wheel to be substantially equalized.

Figure 14:
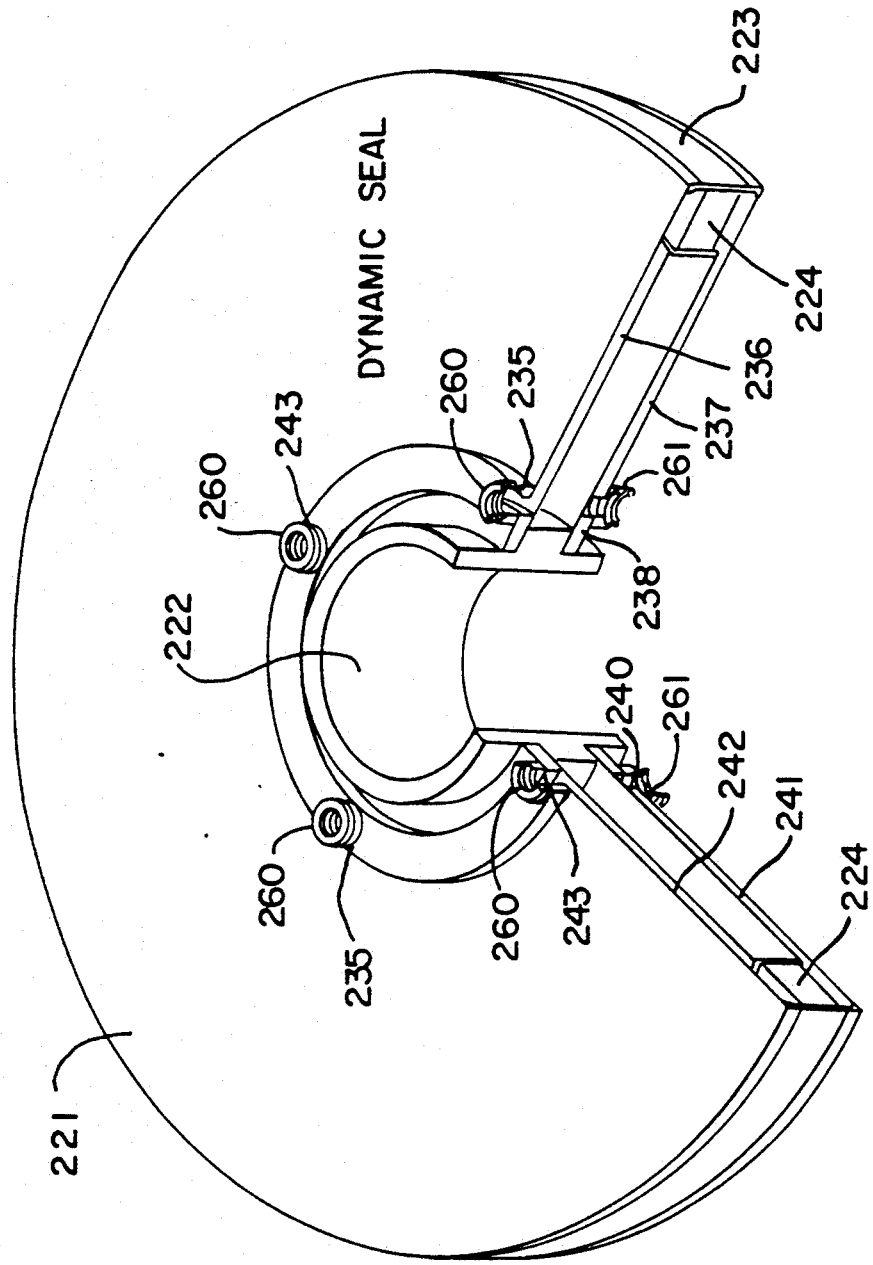
FIG. 14 is a perspective and partially cut-away view of a wheel assembly of the rotary AMR apparatus of FIG. 13.
Figure 15:
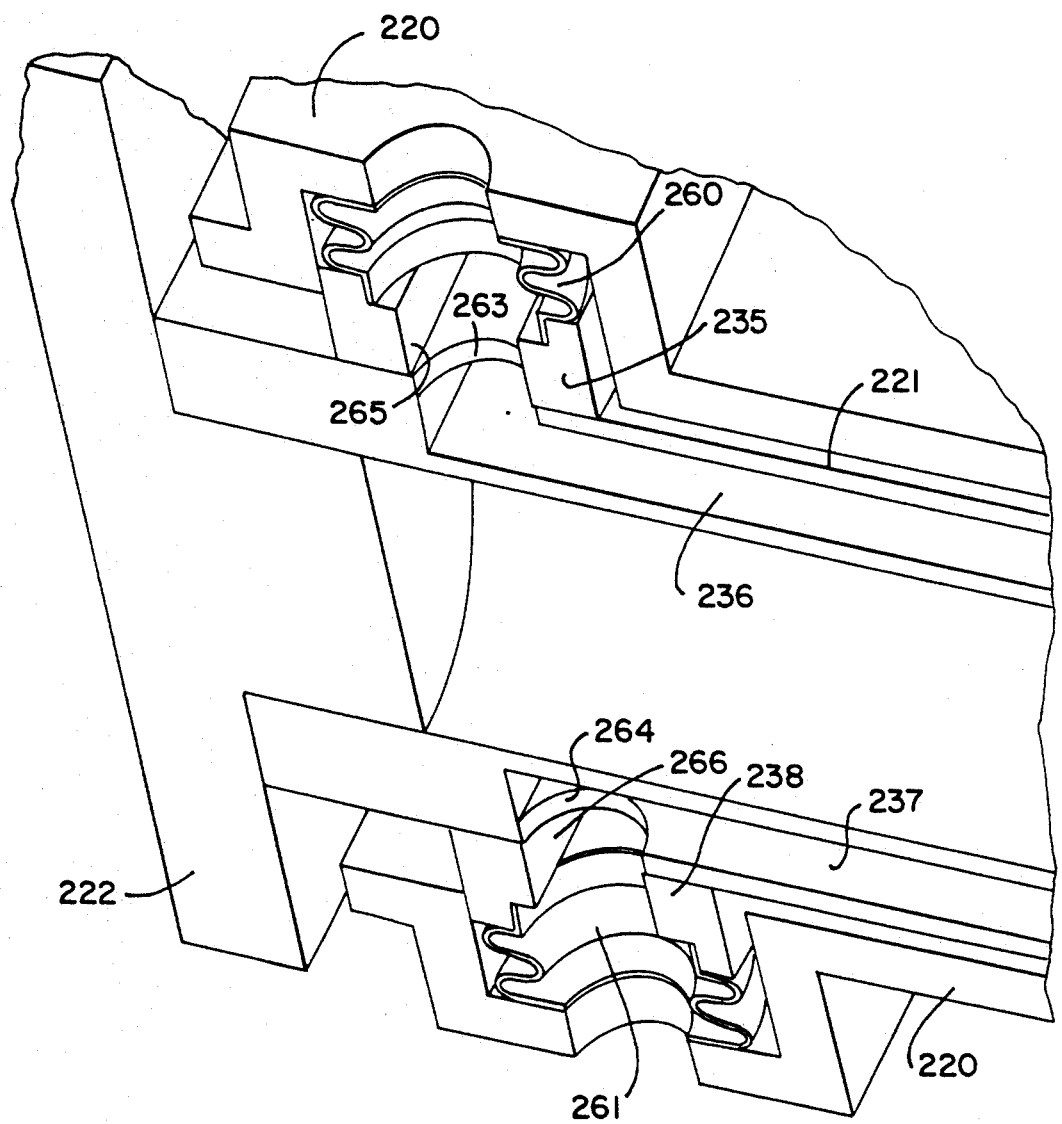
FIG. 15 is a detailed perspective cut-away view of the AMR apparatus of FIG. 13 illustrating the seals at the interface between the housing and the rotating wheel.
Figure 16:
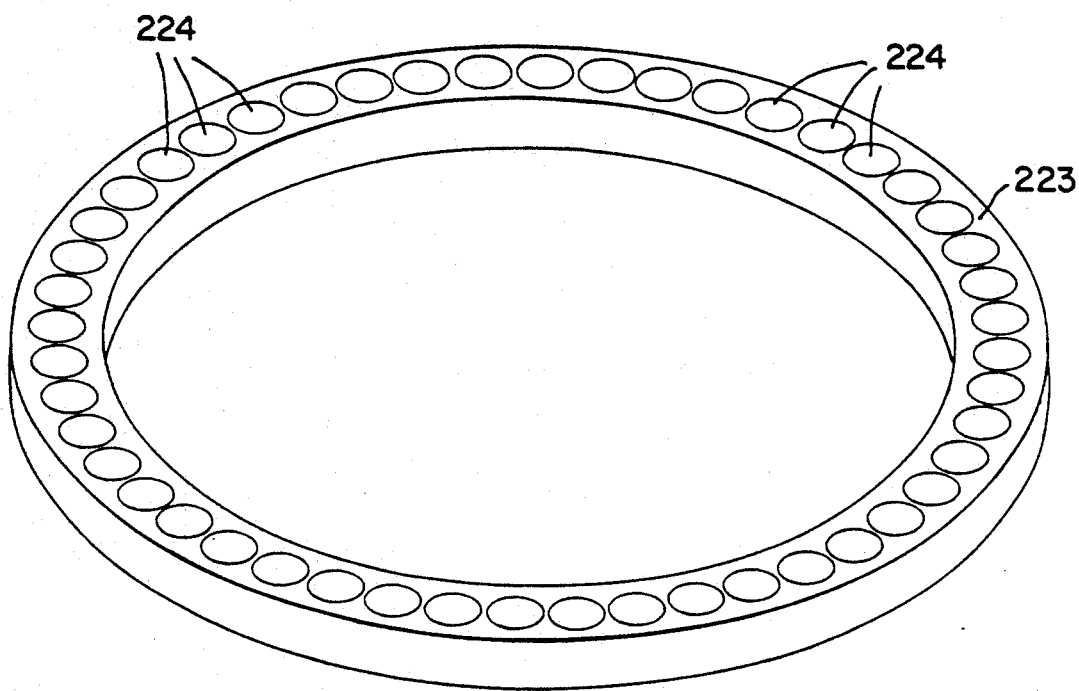
FIG. 16 is a perspective view of a magnetic material bed ring which forms the rim of the wheel in the rotary AMR apparatus of FIG. 13.

The manifold sliding seal arrangement between the housing and wheel with internal manifolding is best shown in the views of FIG. 14 and 15. The seals 235, 238, 240 and 243 are pressed by spring loaded bellows units 260 and 261, respectively, against the top and bottom of the wheel housing 21 to provide a seal. As the wheel moves, openings 263 and 264, come into communication with manifold channels 265 and 266 in the seals 235 and 238, respectively. The manifold channels 265 and 266 extend over an arc of the circumference of the seal which is less than a full quadrant, so that fluid is provided from the seal to only the appropriate openings 263 and 264 to provide communication of fluid with the appropriate channels 236 and 237 leading to AMR units in the peripheral rim of the wheel. As is illustrated in FIG. 16, the rim 223 of the wheel preferably is formed as a solid ring with sets of individual AMR bed units 224 in place therein which are separated from one another so that there is no lateral flow of fluid between the bed units 224.

For both the reciprocating and rotating embodiments of the active magnetic regenerator apparatus of the invention, efficiency is obtained which is comparable to much larger gas cycle plants. Moreover, a more compact magnetic hydrogen liquefier is obtained than can be achieved with a gas cycle plant. Further, the magnetic hydrogen liquifier in accordance with the invention can operate from 77 K or other cryogenic temperatures at which heat sinks may be readily available. Excess capacity liquid nitrogen at large plants can be exploited, if available. By adding additional stages, the magnetic hydrogen liquifier can operate from 110 K, the normal boiling point of natural gas. Thus, locations at which liquid natural gas is boiled off can be utilized as potential cooling sites. The apparatus can be extended to operate down to 4 K to function as a helium liquifier by the addition of one or two stages.

It is understood that the invention is not confined to the particular embodiments set forth herein as illustrative, but embraces such modified forms thereof as come within the scope of the following claims.

What is claimed is:

1. Active magnetic regenerator apparatus comprising:
   (a) a porous regenerator bed of material that exhibits the magnetocaloric effect, the bed having a higher temperature hot side and a lower temperature cold side;
   (b) heat transfer fluid which can pass through the bed between the hot and cold sides to effect heat transfer with the material of the bed;
   (c) a magnet producing a magnetic field;
   (d) means for causing the magnetic field of the magnet to be applied alternately to the bed and removed from the bed;
   (e) transfer means for providing a path for the fluid to and from the regenerator bed and for driving a first volume of the fluid through the bed from the hot side to the cold side when the magnetic field is removed from the bed and for driving a second volume of the same fluid through the bed from the cold side to the hot side when the magnetic field is applied to the bed, wherein the first volume is greater than the second volume, and for providing a path from the cold side to the hot side for diverting a portion of the first volume of fluid so that it flows back to the hot side of the bed without passing through the bed from the cold side to the hot side.

2. The apparatus of claim 1 including a heat exchanger in the path from the cold side to the hot side through which the fluid is diverted, the heat exchanger also having a path therethrough for passage of fluid to be cooled, such that the diverted heat transfer fluid passed through the heat exchanger receives heat from the fluid to be cooled as it passes back to the hot side of the bed.

3. The apparatus of claim 2 wherein the heat transfer fluid is helium gas and the fluid to be cooled is hydrogen gas.

4. The apparatus of claim 1 wherein the regenerator bed is formed of two parts, each bed part having a hot side and a cold side, wherein the transfer means establishes a path to and from the hot side and the cold side of each bed part and transfers the first volume of heat transfer fluid to a first of the bed parts from the hot side to the cold side and transfers the second volume through the second bed part from the cold side to the hot side thereof, the second bed part having the magnetic field from the magnet applied thereto and the first bed part having the magnetic field removed therefrom.

5. The apparatus of claim 4 wherein the means for causing the magnetic field to be applied alternately to the bed and removed from the bed alternately applies the magnetic field to the first bed and then to the second bed in repeated cycles, and wherein the transfer means reverses the flow of the first and second volumes of fluid through the first and second bed parts when the magnetic field is applied to the first bed part and removed from the second bed part.

6. The apparatus of claim 5 wherein the first and second bed parts, the magnet, and the means for causing the magnetic field to be applied alternately to the bed and removed from the bed comprise a first stage, and including a second stage having first and second bed parts, a magnet and means for causing the magnetic field to be applied alternatively to the bed parts and removed from the bed parts as in the first stage, and wherein the transfer means establishes a path for heat transfer fluid from the cold side of each of the bed parts of the first stage to the hot side of a corresponding one of the bed parts of the second stage and wherein a path is established between the cold side of each of the bed parts of the first stage to divert a portion of the first volume of fluid passing from the hot side to the cold side of a bed part to the cold side of the other bed part of the first stage to pass therethrough to the hot side thereof, and for establishing a path between the cold sides of each of the bed parts of the second stage to allow flow therebetween and for establishing a path from the cold sides of each of the bed parts of the second stage back to the hot sides of the bed parts of the first stage for a portion of the fluid passing from the cold side of a bed part of the second stage.

7. The apparatus of claim 6 including a heat exchanger in the path from the cold sides of the bed parts of the second stage to the hot sides of the bed parts of the first stage, the heat exchanger also passing a fluid therethrough which is to be cooled such that the heat transfer fluid passing through the heat exchanger receives heat from the fluid to be cooled as it passes back to the hot sides of the bed parts of the first stage.

8. The apparatus of claim 7 wherein the heat transfer fluid is helium gas and the fluid to be cooled is hydrogen gas.

9. The apparatus of claim 8 wherein the magnetic material of the bed parts of the first stage is selected from the group consisting of $GdNi_2$, $GdNi$, and a mixture of the two with cobalt substituted for a portion of the nickel, and wherein the magnetic material of the bed parts of the second stage is selected from the group consisting of GdPd and $Er_{0.8}La_{0.2}$.

10. The apparatus of claim 4 wherein the transfer means includes a pump having an input and an output, wherein a path is established from the hot side of the bed parts to the input of the pump and a path is established for the fluid diverted from the cold side of the bed parts to the input of the pump, wherein the path from the hot side of the bed parts to the input of the pump directs fluid to the input of the pump from a bed part only when the magnetic field is applied to the bed part, wherein a path is established from the output of the pump selectively to the hot sides of the bed parts to provide heat transfer fluid to a bed part when the magnetic field is not applied to the bed part.

11. The apparatus of claim 10 including a heat exchanger in the path of the fluid diverted from the cold side of the bed parts to the input of the pump, the heat exchanger also receiving a fluid to be cooled therethrough such that the heat transfer fluid passing through the heat exchanger receives heat from the fluid to be cooled.

12. The apparatus of claim 11 wherein the heat transfer fluid is helium gas and the fluid to be cooled is hydrogen.

13. The apparatus of claim 11 including an additional heat exchanger in the path established from the output of the pump to the hot sides of the bed parts, the additional heat exchanger operable to remove heat from the heat transfer fluid which is supplied to the hot sides of the bed parts.

14. The apparatus of claim 13 wherein the additional heat exchanger is cooled by a bath of liquid nitrogen to remove the heat from the heat transfer fluid.

15. The apparatus of claim 11 wherein the transfer means includes two three-position valves, a first valve in the path from the hot side of the bed parts to the input of the pump and also in communication with the path from the output of the pump, the first valve switchable between a first position in which fluid from the hot side of one of the bed parts is provided to the input of the pump, a second position in which fluid from the output of the pump is provided to the hot side of the bed part, and a third position in which the fluid from the output of the pump is supplied back to the input of the pump and no fluid is supplied to or from the hot side of the bed part, and the second valve in the path between the hot side of the other bed part and the input of the pump and also in communication with the path from the output of the pump, the second valve switchable between a first position in which the output of the pump is provided to the hot side of the bed part, a second position in which fluid from the hot side of the bed part is provided to the input of the pump, and a third position in which the fluid from the output of the pump is supplied to the input of the pump and no fluid flows to or from the hot sides of the bed parts.

16. The apparatus of claim 15 wherein the first and second bed parts, the magnet, and the means for causing the magnetic field of the magnet to be applied alternately to the bed parts and removed from the bed parts comprises a first stage, and including a second stage of the same components, the transfer means establishing a fluid flow path from the cold sides of the two bed parts of the first stage to the hot sides of the two bed parts of the second stage, a fluid flow path between the cold sides of the two bed parts of the first stage to divert a portion of the fluid passing out of the cold side of one bed part of the first stage to the cold side of the second bed part of the first stage, and a fluid flow path between the cold sides of the two bed parts of the second stage, and for providing a fluid flow path for diverting a portion of the fluid flowing from the cold side of either of the two bed parts of the second stage back to the input of the pump.

17. The apparatus of claim 16 including a heat exchanger in the path of the fluid diverted from the cold sides of the bed parts of the second stage to the input of the pump, the heat exchanger also receiving a gas to be cooled therethrough such that heat transfer fluid passing through the heat exchanger receives heat from the gas to be cooled.

18. The apparatus of claim 1 wherein the regenerator bed is fixed in position and the magnet is mounted for reciprocating motion toward and away from the bed, and the means for causing the magnetic field to be applied alternately to the bed drives the magnet in cyclical reciprocating motion toward and away from the bed.

19. The apparatus of claim 1 wherein the bed is formed of a plurality of bed units mounted in a rim of a wheel mounted for rotation about an axis, wherein the magnet is mounted about the wheel to apply the magnetic field to a portion of the wheel, and the means for causing the magnetic field to alternately be applied to the bed drives the wheel in continuous rotation, and wherein the transfer means includes a manifold for distributing the heat transfer fluid to a portion of the wheel outside the magnetic field to pass therethrough from the hot side to the cold side of the regenerator bed units, and for distributing heat transfer fluid to a portion of the wheel in the magnetic field to pass fluid from the cold side to the hot side of the regenerator bed units which are in the magnetic field as the wheel rotates.

20. The apparatus of claim 11 wherein the wheel includes radial channels therein for providing a path for the heat transfer fluid from openings adjacent to the axis of the wheel out to the rim of the wheel to the bed units, and wherein the manifold has sliding seals which are in sliding contact with the wheel at positions adjacent to the axis of the wheel to direct heat transfer fluid to and receive heat transfer fluid from the openings to the channels in the wheel as the wheel rotates.

21. Active magnetic regenerator apparatus comprising:
   (a) first and second stage regenerator beds, the bed of each stage composed of two parts, each bed part formed of material that exhibits the magnetocaloric effect and is porous to allow the flow of heat transfer fluid therethrough, each bed part having a higher temperature hot side and a lower temperature cold side;
   (b) two superconducting solenoidal magnets having internal bores such that the magnets can surround 14 the bed parts of the first and second stages and selectively apply a magnetic field thereto;
   (c) means for mounting the magnets with respect to the regenerator beds of the first and second stage such that the bed parts and the magnet can be moved relative to one another from a position in which a first magnet is over the first bed part of the first stage to a position in which it is over the second bed part of the first stage, and for moving the second magnet and the second stage beds relative to one another from a position in which the magnet is over a first bed part of the second stage to a position wherein the magnet is over the second bed part of the second stage;
   (d) drive means for selectively driving the magnets and the bed parts relative to one another between a first position in which each magnet is over a first bed part of the first and second stages and a second position in which each magnet is over a second bed part of the first and second stages;
   (e) lines establishing a path for heat transfer fluid from the cold side of the first bed part of the first stage to the hot side of the first bed part of the second stage, from the hot side of the second bed part of the second stage to the cold side of the second bed part of the first stage, from the cold side of the first bed part of the first stage to the cold side of the second bed part of the first stage, and from the cold side of the first bed part of the second stage to the cold side of the second bed part of the second stage;
   (f) a heat exchanger having a path therethrough for heat transfer fluid and a path for fluid to be cooled such that heat can be transferred from the fluid to be cooled to the heat transfer fluid passing through the heat exchanger;
   (g) a pump for heat transfer fluid having an input and an output;
   (h) lines establishing a path for heat transfer fluid from the cold side of the first and second bed parts of the second stage through the heat exchanger to the input of the pump, from the hot sides of the first and second bed parts of the first stage to the input of the pump, and from the output of the pump to the hot sides of the first and second bed parts of the first stage, and switching valves in the lines between the hot sides of the first and second bed parts of the first stage and the input and the output of the pump, the switching valves switchable to a position in which heat transfer fluid is supplied from the hot side of the first bed part of the first stage to the input of the pump and from the output of the pump to the hot side of the second bed part of the first stage, and the valves switchable to a second position in which heat transfer fluid is supplied through the lines from the hot side of the second bed part of the first stage to the input of the pump and the output of the pump is supplied through the lines to the hot side of the first bed part of the first stage, the switching of the valves coordinated with the position of the magnets with respect to the bed parts so that heat transfer fluid is supplied from the first bed part or the second bed part of the first stage to the input of the pump depending on which bed part has a magnet applying a magnetic field to it.

22. The apparatus of claim 21 wherein the switching valves are switchable to a third position in which there is no flow of heat transfer fluid from the bed parts of the first stage or from the output of the pump to the bed parts of the first stage, and wherein the heat transfer fluid flows through the lines through the switching valves from the output of the pump back to the input of the pump during the times that the magnets and heat transfer beds are moving relative to one another and the magnets are not applying a magnetic field to one or the other of the bed parts.

23. The apparatus of claim 21 including a frame, the first and second stage bed parts mounted to the frame, and wherein the means for mounting includes carriages supported for reciprocating motion on the frame and supporting the magnets to reciprocate between positions in which the magnets are over a first bed part of each of the first and second stages to a position wherein the magnets are over a second bed part of each of the first and second stages, and further including drive means operably connected to the carriages to drive the carriages and the magnets mounted thereon selectively in reciprocating motion.

24. The apparatus of claim 21 wherein the heat transfer fluid is helium gas and the fluid to be cooled is hydrogen gas.

25. The apparatus of claim 21 wherein the magnetic material of the bed parts of the first stage is selected from the group consisting of $GdNi_2$, $GdNi$, and a mixture of the two with cobalt substituted for a portion of the nickel, and wherein the magnetic material of the bed parts of the second stage is selected from the group consisting of $GdPd$ and $Er_{0.8}La_{0.2}$.

26. The apparatus of claim 21 including an additional heat exchanger in the lines establishing the path from the output of the pump to the hot sides of the first stage bed parts, the additional heat exchanger operable to remove heat from the heat transfer fluid which is supplied to the hot sides of the bed parts.

27. The apparatus of claim 26 wherein the additional heat exchanger is cooled by liquid nitrogen to remove the heat from the heat transfer fluid.

28. Active magnetic regenerator apparatus comprising:
   (a) a wheel mounted for rotation about an axis and having a rim;

(b) a plurality of porous regenerator bed units formed of material that exhibits the magnetocaloric effect, each bed unit having a higher temperature hot side and a lower temperature cold side, the bed units mounted in the rim of the wheel to allow axial flow of heat transfer fluid therethrough;

(c) radial channels formed in the wheel to provide a path for heat transfer fluid from openings near the axis of rotation of the wheel to the hot side of each of the bed units and from the cold side of each of the bed units to openings in the wheel near the axis;

(d) a magnet mounted to apply a magnetic field to a portion of the regenerator bed units on the rim of the wheel so that the bed units have the magnetic field applied thereto as the wheel rotates to bring the bed units into the magnetic field of the magnet, and such that the magnetic field from the magnet is removed from the bed units as the wheel continues to rotate so that the bed units have a magnetic field applied thereto cyclically as the wheel rotates;

(e) a manifold having ports with sliding seals in engagement with the wheel to supply heat transfer fluid to an input port and receive fluid from an output port, the seals providing selective communication of heat transfer fluid with the radial channels in the wheel to direct fluid to and from selected regenerator bed units, the manifold cooperating with the channels in the wheel to provide heat transfer fluid from the cold side to the hot side of the bed units which are outside of the magnetic field of the magnet and from the cold side to the hot side of the bed units that are in the magnetic field of the magnet.

29. The apparatus of claim 28 including a pump for heat transfer fluid having an input and an output, lines establishing a path for heat transfer fluid from the output port of the manifold leading from the bed units in the magnetic field to the input of the pump and from the output of the pump to the input port of the manifold leading from the bed units outside the magnetic field, and a heat exchanger in the lines from the output port of the manifold to the input port of the pump, the heat exchanger passing a fluid therethrough which is to be cooled such that the heat transfer fluid passing through the heat exchanger receives heat from the fluid to be cooled as it passes therethrough, and lines establishing a path from the output port of the manifold to the input port of the manifold.

30. The apparatus of claim 29 wherein the heat transfer fluid is helium gas and the fluid to be cooled is hydrogen gas.

31. The apparatus of claim 29 including an additional heat exchanger in the lines establishing a path from the output of the pump to the input port of the manifold, the additional heat exchanger operable to remove heat from the heat transfer fluid which is supplied to the input port of the manifold.

32. The apparatus of claim 28 wherein there are two wheels having a plurality of bed units, with a manifold for each wheel having an input port and an output port on each side of the wheel leading to and from, respectively, the bed units in the magnetic field and the bed units outside the magnetic field, and a magnet for each wheel to apply a magnetic field to a portion of the bed units, a pump for heat transfer fluid having an input and an output, and lines establishing a path for heat transfer fluid from the output port of the first wheel to the input port of the second wheel, from the output port of the second wheel to the input of the pump, from the output of the pump to the input port of the first wheel, from one output port of the second wheel to the input port on the same side of the wheel, and from an output port of the first wheel to the input port of the first wheel on the same side of the wheel to divert a portion of the flow from the output port of the first wheel to the input port of the first wheel.

33. The apparatus of claim 32 including a heat exchanger in the lines establishing the path of fluid from the output port of the second wheel to the input of the pump, the heat exchanger also receiving fluid to be cooled therethrough such that the heat transfer fluid passing through the heat exchanger receives heat from the fluid to be cooled.

34. Active magnetic regenerator apparatus comprising:

(a) at least two regenerator stages, each stage having a porous regenerator bed formed of two parts of material which exhibits the magnetocaloric effect, each part of the bed having a higher temperature hot side and a lower temperature cold side, a heat transfer fluid which can pass through the beds between the hot and cold sides to effect heat transfer with the material of the bed, a magnet for each stage producing a magnetic field, means for causing the magnetic field of the magnet for each stage to be applied alternately to one of the bed parts and removed from one of the bed parts;

(b) lines establishing a path for heat transfer fluid from the cold side of each of the bed parts of a first stage to the hot side of a corresponding one of the bed parts of a second stage, establishing a path for fluid between the cold side of each of the bed parts of the first stage to divert a portion of a first volume of fluid passing from the hot side to the cold side of a bed part of the first stage to the cold side of the other bed part of the first stage to pass therethrough to the hot side thereof, for establishing a path between the cold sides of each of the bed parts of a second stage to allow flow therebetween and for establishing a path from the cold sides of each of the bed parts of the second stage back to the hot sides of the bed parts of the first stage for a portion of the fluid passing from the cold side of a bed part of the second stage.

35. The apparatus of claim 34 including a heat exchanger in the path from the cold sides of the bed parts of the second stage to the hot sides of the bed parts of the first stage, the heat exchanger also passing a fluid therethrough which is to be cooled such that the heat transfer fluid passing through the heat exchanger receives heat from the fluid to be cooled as it passes back to the hot sides of the bed parts of the first stage.

36. The apparatus of claim 35 wherein the heat transfer fluid is helium gas and the fluid to be cooled is hydrogen gas.

37. The apparatus of claim 36 wherein the magnetic material of the bed parts of the first stage is selected from the group consisting of $GdNi_2$, $GdNi$, and a mixture of the two with cobalt substituted for a portion of the nickel, and wherein the magnetic material of the bed parts of the second stage is selected from the group consisting of $GdPd$ and $Er_{0.8}La_{0.2}$.

38. The apparatus of claim 34 including a pump having an input and an output, lines establishing a path from the hot side of the bed parts of the first stage to the input of the pump and from the output of the pump from the hot sides of the bed parts of the first stage, and wherein the lines provide a path from the cold sides of the bed parts of the second stage to the input of the pump, and switching valves in the lines between the hot sides of the first and second bed parts of the first stage and the input and output of the pump, the switching valves switchable to a position in which heat transfer fluid is supplied from the hot side of a first bed part of the first stage to the input of the pump and from the output of the pump to the hot side of the second bed part of the first stage, and the valves switchable to a second position in which heat transfer fluid is supplied through the lines from the hot side of the second bed part of the first stage to the input of the pump and the output of the pump is supplied through the lines to the hot side of the first bed part of the first stage, the switching of the valves coordinated to the application of the magnetic field to the bed parts so that heat transfer fluid is supplied from the first bed part or the second bed part of the first stage to the input of the pump depending on which bed part has a magnetic field applied to it.

39. The apparatus of claim 38 wherein the switching valves are switchable to a third position in which there is no flow of heat transfer fluid from the bed parts of the first stage or from the output of the pump to the bed parts of the first stage, and wherein the heat transfer fluid flows through the lines from the output of the pump back to the input of the pump during the times that the magnets are not applying a magnetic field to one or the other of the bed parts.

40. The apparatus of claim 38 including an additional heat exchanger in the lines establishing the paths from the output of the pump to the hot sides of the first stage bed parts, the additional heat exchanger operable to remove heat from the heat transfer fluid which is supplied to the hot sides of the bed parts.

41. A method of providing regenerative cooling of a heat transfer fluid comprising the steps of:
(a) providing a porous regenerator bed of material which exhibits the magnetocaloric effect, the bed having two sides;
(b) alternately applying a magnetic field to and removing the magnetic field from the regenerator bed;
(c) passing heat transfer fluid through the bed in one direction with no magnetic field applied to the bed and passing heat transfer fluid through the bed in the other direction with a magnetic field applied to the bed, such that one side of the bed is a higher temperature hot side and the other side of the bed is a lower temperature cold side, the heat transfer fluid being passed through the bed from the hot side to the cold side when no magnetic field is applied to the bed and from the cold side to the hot side when a magnetic field is applied to the bed; and
(d) diverting a portion of the volume of heat transfer fluid passed through the bed from the hot side to the cold side back to the hot side of the bed such that the volume of fluid passed through the bed from the hot side to the cold side is greater than the volume of fluid passed back through the bed from the cold side to the hot side.

42. The method of claim 41 including the additional step of drawing heat from a fluid to be cooled to the heat transfer fluid diverted from the cold side of the bed to the hot side of the bed to warm the diverted fluid and cool the fluid to be cooled.

43. A method of providing regenerative cooling of a heat transfer fluid comprising the steps of:
(a) providing a porous regenerator bed having two bed parts of material that exhibits the magnetocaloric effect, each bed part having a higher temperature hot side and a lower temperature cold side;
(b) alternately applying a magnetic field to and removing the magnetic field from the regenerator bed parts such that the field is applied to one bed part when it is removed from the other;
(c) passing heat transfer fluid through a first of the regenerator bed parts from the hot side to the cold side with no magnetic field applied to the regenerator bed part, and passing a portion of the fluid passed through the first bed part through the second bed part from the cold side to the hot side thereof while a magnetic field is applied to the bed part, and simultaneously diverting a portion of the fluid passed through the first bed part from the hot side to the cold side back to the hot side of the bed part, and supplying the fluid passed through the second bed part from the cold side to the hot side back to the hot side of the first bed part to mix with the fluid diverted from the cold side of the first bed part.

44. The method of claim 43 including the additional step of drawing heat from a fluid to be cooled to the heat transfer fluid diverted from the cold side to the hot side of the first bed part to cool the fluid to be cooled and warm the diverted heat transfer fluid.

45. The method of claim 43 wherein a magnetic field is applied alternately to the first bed part and the second bed part and including the additional steps of passing the heat transfer fluid from the hot side of the second bed part to the cold side thereof when the magnetic field is not applied to the bed part, and passing a portion of the heat transfer fluid passed through the second bed part into the cold side of the first bed part to pass from the cold side to the hot side thereof while magnetic field is applied to the first bed part, and diverting a portion of the fluid passed through the first and second bed parts back to the hot side of the second bed part to be mixed with fluid passing from the hot side of the first bed part.

46. A regenerator bed structure for an active magnetic regenerator apparatus, comprising:
(a) an elongated tubular housing;
(b) two bed parts mounted in the housing, each bed part formed of plural bed sections having two sides mounted in the housing in stacked relation, each bed part formed of a material which exhibits the magnetocaloric effect and which is porous to the flow of heat transfer fluid therethrough;
(c) first and second ports formed in the housing for one of the bed parts and first and second ports formed in the housing for the other of the bed parts;
(d) channels in the housing extending from the first port for each of the bed parts to one side of each section in the bed part, and channels extending from the second port for each of the bed parts to the other side of each section in the bed part, such that heat transfer fluid flowing into the first port for each of the bed parts flows through the channels to one side of each section in the bed part through the sections in parallel and out the other sides of each section and through the channels leading to the second port for each bed part.

47. The regenerator bed of claim 46 wherein the material which exhibits the magnetocaloric effect in each of the bed sections of each bed part comprises small spherical pellets of material which exhibits the magnetocaloric effect with interstices therebetween through which the heat transfer fluid can flow.

48. The regenerator bed of claim 47 wherein each bed section includes a cylindrical outer ring within which the pellets of magnetocaloric material are contained, end caps closing the ends of the outer ring and having lateral channels formed therein to direct flow of heat transfer fluid laterally through the channels in one end cap and then axially through the magnetocaloric material to the other end cap and then laterally through the channels in the other end cap.

49. The regenerator bed of claim 48 wherein each bed section in each bed part includes a flow divider having sections which extend axially between the end caps to divide the flow of heat transfer fluid as it passes through the bed section.

50. The regenerator bed of claim 46 wherein the magnetic material of the bed parts is selected from the group consisting of $GdNi_2$, $GdNi$, mixtures of the two with cobalt substituted for a portion of the nickel, $GdPd$, and $Er_{0.8}La_{0.2}$.

51. Active magnetic regenerator apparatus comprising:

(a) a first stage comprising a porous regenerator bed of material that exhibits the magnetocaloric effect selected from the group consisting of $GdNi_2$, $GdNi$, and a mixture of the two with cobalt substituted for a portion of the nickel, the bed having a higher temperature hot side and a lower temperature cold side, heat transfer fluid which can pass through the bed between the hot and cold sides to effect heat transfer with the material of the bed, a magnet for producing a magnetic field, and means for causing the magnetic field of the magnet to be applied alternately to the bed of the first stage and removed from the bed of the first stage;

(b) a second stage comprising a porous regenerator bed of material that exhibits the magnetocaloric effect selected from the group consisting of $GdPd$, $GdPd_{0.75}Ni_{0.25}$ and $Er_{0.8}La_{0.2}$, the bed having a higher temperature hot side and a lower temperature cold side, heat transfer fluid which can pass through the bed between the hot and cold sides to effect heat transfer with the material of the bed, a magnet producing a magnetic field, and means for causing the magnetic field of the magnet to be applied alternately to the bed of the second stage and removed from the bed of the second stage;

(c) transfer means for providing a path for the fluid to and from the regenerator beds of the first and second stages, wherein the transfer means establishes a path for heat transfer fluid from the cold side of the bed of the first stage to the hot side of the bed of the second stage, and for establishing a path from the cold side of the bed of the second stage to the hot side of the bed of the first stage for at least a portion of the fluid passing from the cold side of the bed of the second stage, and for driving a first volume of the fluid through the beds of each stage from the hot side to the cold side of each when the magnetic field is removed from the beds and for driving a second volume of the fluid through the beds of each stage from the cold side to the hot side of each when the magnetic field is applied to the beds.

52. The apparatus of claim 51 wherein the transfer means provides a path from the cold side to the hot side of the first stage bed for diverting a portion of the first volume of fluid though the bed of the first stage so that it flows back to the hot side of the first stage bed without passing through the first stage bed from the cold side to the hot side.

53. The apparatus of claim 51 wherein the heat transfer fluid is helium gas.

* * * * *

UNITED STATES PATENT AND TRADEMARK OFFICE
CERTIFICATE OF CORRECTION

PATENT NO. : 5,249,424
DATED : October 5, 1993
INVENTOR(S) : DeGregoria, et al.

It is certified that error appears in the above-indentified patent and that said Letters Patent is hereby corrected as shown below:

In column 5, line 32 of the patent, "$T_3$and" should be --$T_3$ and--

In column 9, line 40 of the patent, "$\Delta T$, at $T_0(0-7T)$" should be --$\Delta T$, at $T_0(0-7T)$--

Column 17, line 25, "14" should deleted.

Signed and Sealed this

Twenty-fourth Day of May, 1994

Attest:

BRUCE LEHMAN

*Attesting Officer*          *Commissioner of Patents and Trademarks*

UNITED STATES PATENT AND TRADEMARK OFFICE
CERTIFICATE OF CORRECTION

PATENT NO. : 5,249,424
DATED : October 5, 1993
INVENTOR(S) : Anthony J. DeGregoria, et al.

It is certified that error appears in the above-indentified patent and that said Letters Patent is hereby corrected as shown below:

column 1, at line 3, after the title and before the "FIELD OF THE INVENTION":

This invention was made with Government support under Contract No. DE-AC02-90CE40895 awarded by the Department of Energy. The Government has certain rights in this invention.

Signed and Sealed this

Sixth Day of June, 1995

Attest:

BRUCE LEHMAN

Attesting Officer

Commissioner of Patents and Trademarks